US012587806B2

(12) United States Patent
Telfort et al.

(10) Patent No.: US 12,587,806 B2
(45) Date of Patent: Mar. 24, 2026

(54) SYSTEMS FOR USING AN AURICULAR DEVICE CONFIGURED WITH AN INDICATOR AND BEAMFORMER FILTER UNIT

(71) Applicant: Masimo Corporation, Irvine, CA (US)

(72) Inventors: Valery G Telfort, Irvine, CA (US); Luke John Campbell, Brunswick (AU)

(73) Assignee: Viper Holdings Corporation, Carlsbad, CA (US)

( * ) Notice: Subject to any disclaimer, the term of this patent is extended or adjusted under 35 U.S.C. 154(b) by 131 days.

(21) Appl. No.: 18/433,061

(22) Filed: Feb. 5, 2024

(65) Prior Publication Data

US 2024/0267698 A1 Aug. 8, 2024

Related U.S. Application Data

(60) Provisional application No. 63/483,491, filed on Feb. 6, 2023.

(51) Int. Cl.
*H04S 7/00* (2006.01)
*H04R 1/10* (2006.01)

(52) U.S. Cl.
CPC .......... *H04S 7/304* (2013.01); *H04R 1/1016* (2013.01)

(58) Field of Classification Search
CPC .... H04R 3/005; H04R 1/1016; H04R 25/407; H04R 2225/41; H04R 2460/01; H04S 7/304
USPC .................................................. 381/17, 23.1
See application file for complete search history.

(56) References Cited

U.S. PATENT DOCUMENTS

| | | | |
|---|---|---|---|
| 4,960,128 | A | 10/1990 | Gordon et al. |
| 4,964,408 | A | 10/1990 | Hink et al. |
| 5,319,355 | A | 6/1994 | Russek |
| 5,337,744 | A | 8/1994 | Branigan |
| 5,341,805 | A | 8/1994 | Stavridi et al. |
| 5,377,676 | A | 1/1995 | Vari et al. |
| 5,431,170 | A | 7/1995 | Mathews |

(Continued)

FOREIGN PATENT DOCUMENTS

| | | |
|---|---|---|
| EP | 1 531 650 | 5/2005 |
| EP | 3 057 340 | 5/2019 |

(Continued)

OTHER PUBLICATIONS

US 2024/0016391 A1, 01/2024, Lapotko et al. (withdrawn)

*Primary Examiner* — Paul Kim

(57) ABSTRACT

A system may include an external device configured to transmit a first audio data to an ear-bud. A system may include the ear-bud configured to be positioned within an ear canal of a user, the ear-bud comprising: a microphone configured to generate audio data responsive to detecting audio, a storage device, configured to store computer-executable instructions; and one or more processors in communication with the storage device, wherein the computer-executable instructions, when executed by the one or more processors, cause the one or more processors to: receive the first audio data from the external device, receive a second audio data from the microphone, estimate an acoustic environment based on the first audio data and the second audio data, generate a third audio data based on the acoustic environment, and cause a speaker to emit the third audio data.

20 Claims, 18 Drawing Sheets

(56) References Cited

U.S. PATENT DOCUMENTS

| | | | |
|---|---|---|---|
| 5,436,499 | A | 7/1995 | Namavar et al. |
| 5,456,252 | A | 10/1995 | Vari et al. |
| 5,479,934 | A | 1/1996 | Imran |
| 5,482,036 | A | 1/1996 | Diab et al. |
| 5,494,043 | A | 2/1996 | O'Sullivan et al. |
| 5,533,511 | A | 7/1996 | Kaspari et al. |
| 5,590,649 | A | 1/1997 | Caro et al. |
| 5,602,924 | A | 2/1997 | Durand et al. |
| 5,638,816 | A | 6/1997 | Kiani-Azarbayjany et al. |
| 5,638,818 | A | 6/1997 | Diab et al. |
| 5,645,440 | A | 7/1997 | Tobler et al. |
| 5,671,914 | A | 9/1997 | Kalkhoran et al. |
| 5,726,440 | A | 3/1998 | Kalkhoran et al. |
| D393,830 | S | 4/1998 | Tobler et al. |
| 5,743,262 | A | 4/1998 | Lepper, Jr. et al. |
| 5,747,806 | A | 5/1998 | Khalil et al. |
| 5,750,994 | A | 5/1998 | Schlager |
| 5,758,644 | A | 6/1998 | Diab et al. |
| 5,760,910 | A | 6/1998 | Lepper, Jr. et al. |
| 5,890,929 | A | 4/1999 | Mills et al. |
| 5,919,134 | A | 7/1999 | Diab |
| 5,987,343 | A | 11/1999 | Kinast |
| 5,997,343 | A | 12/1999 | Mills et al. |
| 6,002,952 | A | 12/1999 | Diab et al. |
| 6,010,937 | A | 1/2000 | Karam et al. |
| 6,027,452 | A | 2/2000 | Flaherty et al. |
| 6,040,578 | A | 3/2000 | Malin et al. |
| 6,066,204 | A | 5/2000 | Haven |
| 6,115,673 | A | 9/2000 | Malin et al. |
| 6,124,597 | A | 9/2000 | Shehada et al. |
| 6,128,521 | A | 10/2000 | Marro et al. |
| 6,129,675 | A | 10/2000 | Jay |
| 6,144,868 | A | 11/2000 | Parker |
| 6,152,754 | A | 11/2000 | Gerhardt et al. |
| 6,184,521 | B1 | 2/2001 | Coffin, IV et al. |
| 6,232,609 | B1 | 5/2001 | Snyder et al. |
| 6,241,683 | B1 | 6/2001 | Macklem et al. |
| 6,253,097 | B1 | 6/2001 | Aronow et al. |
| 6,255,708 | B1 | 7/2001 | Sudharsanan et al. |
| 6,280,381 | B1 | 8/2001 | Malin et al. |
| 6,285,896 | B1 | 9/2001 | Tobler et al. |
| 6,308,089 | B1 | 10/2001 | von der Ruhr et al. |
| 6,317,627 | B1 | 11/2001 | Ennen et al. |
| 6,321,100 | B1 | 11/2001 | Parker |
| 6,334,065 | B1 | 12/2001 | Al-Ali et al. |
| 6,360,114 | B1 | 3/2002 | Diab et al. |
| 6,368,283 | B1 | 4/2002 | Xu et al. |
| 6,411,373 | B1 | 6/2002 | Garside et al. |
| 6,415,167 | B1 | 7/2002 | Blank et al. |
| 6,430,437 | B1 | 8/2002 | Marro |
| 6,430,525 | B1 | 8/2002 | Weber et al. |
| 6,463,311 | B1 | 10/2002 | Diab |
| 6,470,199 | B1 | 10/2002 | Kopotic et al. |
| 6,487,429 | B2 | 11/2002 | Hockersmith et al. |
| 6,505,059 | B1 | 1/2003 | Kollias et al. |
| 6,525,386 | B1 | 2/2003 | Mills et al. |
| 6,526,300 | B1 | 2/2003 | Kiani et al. |
| 6,534,012 | B1 | 3/2003 | Hazen et al. |
| 6,542,764 | B1 | 4/2003 | Al-Ali et al. |
| 6,580,086 | B1 | 6/2003 | Schulz et al. |
| 6,584,336 | B1 | 6/2003 | Ali et al. |
| 6,587,196 | B1 | 7/2003 | Stippick et al. |
| 6,587,199 | B1 | 7/2003 | Luu |
| 6,597,932 | B2 | 7/2003 | Tian et al. |
| 6,606,511 | B1 | 8/2003 | Ali et al. |
| 6,635,559 | B2 | 10/2003 | Greenwald et al. |
| 6,639,668 | B1 | 10/2003 | Trepagnier |
| 6,640,116 | B2 | 10/2003 | Diab |
| 6,640,117 | B2 | 10/2003 | Makarewicz et al. |
| 6,658,276 | B2 | 12/2003 | Kiani et al. |
| 6,661,161 | B1 | 12/2003 | Lanzo et al. |
| 6,697,656 | B1 | 2/2004 | Al-Ali |
| 6,697,658 | B2 | 2/2004 | Al-Ali |
| RE38,476 | E | 3/2004 | Diab et al. |
| RE38,492 | E | 4/2004 | Diab et al. |
| 6,738,652 | B2 | 5/2004 | Mattu et al. |
| 6,760,607 | B2 | 7/2004 | Al-Ali |
| 6,788,965 | B2 | 9/2004 | Ruchti et al. |
| 6,816,241 | B2 | 11/2004 | Grubisic |
| 6,822,564 | B2 | 11/2004 | Al-Ali |
| 6,850,787 | B2 | 2/2005 | Weber et al. |
| 6,850,788 | B2 | 2/2005 | Al-Ali |
| 6,876,931 | B2 | 4/2005 | Lorenz et al. |
| 6,920,345 | B2 | 7/2005 | Al-Ali et al. |
| 6,934,570 | B2 | 8/2005 | Kiani et al. |
| 6,943,348 | B1 | 9/2005 | Coffin, IV |
| 6,956,649 | B2 | 10/2005 | Acosta et al. |
| 6,961,598 | B2 | 11/2005 | Diab |
| 6,970,792 | B1 | 11/2005 | Diab |
| 6,985,764 | B2 | 1/2006 | Mason et al. |
| 6,990,364 | B2 | 1/2006 | Ruchti et al. |
| 6,998,247 | B2 | 2/2006 | Monfre et al. |
| 7,003,338 | B2 | 2/2006 | Weber et al. |
| 7,015,451 | B2 | 3/2006 | Dalke et al. |
| 7,027,849 | B2 | 4/2006 | Al-Ali |
| D526,719 | S | 8/2006 | Richie, Jr. et al. |
| 7,096,052 | B2 | 8/2006 | Mason et al. |
| 7,096,054 | B2 | 8/2006 | Abdul-Hafiz et al. |
| D529,616 | S | 10/2006 | Deros et al. |
| 7,133,710 | B2 | 11/2006 | Acosta et al. |
| 7,142,901 | B2 | 11/2006 | Kiani et al. |
| 7,225,006 | B2 | 5/2007 | Al-Ali et al. |
| RE39,672 | E | 6/2007 | Shehada et al. |
| 7,254,429 | B2 | 8/2007 | Schurman et al. |
| 7,254,431 | B2 | 8/2007 | Al-Ali et al. |
| 7,254,434 | B2 | 8/2007 | Schulz et al. |
| 7,274,955 | B2 | 9/2007 | Kiani et al. |
| D554,263 | S | 10/2007 | Al-Ali et al. |
| 7,280,858 | B2 | 10/2007 | Al-Ali et al. |
| 7,289,835 | B2 | 10/2007 | Mansfield et al. |
| 7,292,883 | B2 | 11/2007 | De Felice et al. |
| 7,341,559 | B2 | 3/2008 | Schulz et al. |
| 7,343,186 | B2 | 3/2008 | Lamego et al. |
| D566,282 | S | 4/2008 | Al-Ali et al. |
| 7,356,365 | B2 | 4/2008 | Schurman |
| 7,371,981 | B2 | 5/2008 | Abdul-Hafiz |
| 7,373,193 | B2 | 5/2008 | Al-Ali et al. |
| 7,377,794 | B2 | 5/2008 | Al-Ali et al. |
| 7,395,158 | B2 | 7/2008 | Monfre et al. |
| 7,415,297 | B2 | 8/2008 | Al-Ali et al. |
| 7,438,683 | B2 | 10/2008 | Al-Ali et al. |
| 7,483,729 | B2 | 1/2009 | Al-Ali et al. |
| D587,657 | S | 3/2009 | Al-Ali et al. |
| 7,500,950 | B2 | 3/2009 | Al-Ali et al. |
| 7,509,494 | B2 | 3/2009 | Al-Ali |
| 7,510,849 | B2 | 3/2009 | Schurman et al. |
| 7,514,725 | B2 | 4/2009 | Wojtczuk et al. |
| 7,519,406 | B2 | 4/2009 | Blank et al. |
| D592,507 | S | 5/2009 | Wachman et al. |
| 7,530,942 | B1 | 5/2009 | Diab |
| 7,593,230 | B2 | 9/2009 | Abul-Haj et al. |
| 7,596,398 | B2 | 9/2009 | Al-Ali et al. |
| 7,606,608 | B2 | 10/2009 | Blank et al. |
| 7,620,674 | B2 | 11/2009 | Ruchti et al. |
| D606,659 | S | 12/2009 | Kiani et al. |
| 7,629,039 | B2 | 12/2009 | Eckerbom et al. |
| 7,640,140 | B2 | 12/2009 | Ruchti et al. |
| 7,647,083 | B2 | 1/2010 | Al-Ali et al. |
| D609,193 | S | 2/2010 | Al-Ali et al. |
| D614,305 | S | 4/2010 | Al-Ali et al. |
| 7,697,966 | B2 | 4/2010 | Monfre et al. |
| 7,698,105 | B2 | 4/2010 | Ruchti et al. |
| RE41,317 | E | 5/2010 | Parker |
| RE41,333 | E | 5/2010 | Blank et al. |
| 7,729,733 | B2 | 6/2010 | Al-Ali et al. |
| 7,761,127 | B2 | 7/2010 | Al-Ali et al. |
| 7,764,982 | B2 | 7/2010 | Dalke et al. |
| D621,516 | S | 8/2010 | Kiani et al. |
| 7,791,155 | B2 | 9/2010 | Diab |
| RE41,912 | E | 11/2010 | Parker |
| 7,880,626 | B2 | 2/2011 | Al-Ali et al. |
| 7,909,772 | B2 | 3/2011 | Popov et al. |
| 7,919,713 | B2 | 4/2011 | Al-Ali et al. |
| 7,936,887 | B2 | 5/2011 | Smyth |

(56) References Cited

U.S. PATENT DOCUMENTS

| | | | |
|---|---|---|---|
| 7,937,128 | B2 | 5/2011 | Al-Ali |
| 7,937,129 | B2 | 5/2011 | Mason et al. |
| 7,941,199 | B2 | 5/2011 | Kiani |
| 7,957,780 | B2 | 6/2011 | Lamego et al. |
| 7,962,188 | B2 | 6/2011 | Kiani et al. |
| 7,976,472 | B2 | 7/2011 | Kiani |
| 7,990,382 | B2 | 8/2011 | Kiani |
| 8,008,088 | B2 | 8/2011 | Bellott et al. |
| RE42,753 | E | 9/2011 | Kiani-Azarbayjany et al. |
| 8,028,701 | B2 | 10/2011 | Al-Ali et al. |
| 8,048,040 | B2 | 11/2011 | Kiani |
| 8,050,728 | B2 | 11/2011 | Al-Ali et al. |
| RE43,169 | E | 2/2012 | Parker |
| 8,118,620 | B2 | 2/2012 | Al-Ali et al. |
| 8,130,105 | B2 | 3/2012 | Al-Ali et al. |
| 8,182,443 | B1 | 5/2012 | Kiani |
| 8,190,223 | B2 | 5/2012 | Al-Ali et al. |
| 8,203,438 | B2 | 6/2012 | Kiani et al. |
| 8,203,704 | B2 | 6/2012 | Merritt et al. |
| 8,219,172 | B2 | 7/2012 | Schurman et al. |
| 8,224,411 | B2 | 7/2012 | Al-Ali et al. |
| 8,229,532 | B2 | 7/2012 | Davis |
| 8,233,955 | B2 | 7/2012 | Al-Ali et al. |
| 8,255,026 | B1 | 8/2012 | Al-Ali |
| 8,265,723 | B1 | 9/2012 | McHale et al. |
| 8,274,360 | B2 | 9/2012 | Sampath et al. |
| 8,280,473 | B2 | 10/2012 | Al-Ali |
| 8,315,683 | B2 | 11/2012 | Al-Ali et al. |
| RE43,860 | E | 12/2012 | Parker |
| 8,346,330 | B2 | 1/2013 | Lamego |
| 8,353,842 | B2 | 1/2013 | Al-Ali et al. |
| 8,355,766 | B2 | 1/2013 | MacNeish, III et al. |
| 8,374,665 | B2 | 2/2013 | Lamego |
| 8,388,353 | B2 | 3/2013 | Kiani et al. |
| 8,401,602 | B2 | 3/2013 | Kiani |
| 8,414,499 | B2 | 4/2013 | Al-Ali et al. |
| 8,418,524 | B2 | 4/2013 | Al-Ali |
| 8,428,967 | B2 | 4/2013 | Olsen et al. |
| 8,430,817 | B1 | 4/2013 | Al-Ali et al. |
| 8,437,825 | B2 | 5/2013 | Dalvi et al. |
| 8,455,290 | B2 | 6/2013 | Siskavich |
| 8,457,707 | B2 | 6/2013 | Kiani |
| 8,471,713 | B2 | 6/2013 | Poeze et al. |
| 8,473,020 | B2 | 6/2013 | Kiani et al. |
| 8,509,867 | B2 | 8/2013 | Workman et al. |
| 8,515,509 | B2 | 8/2013 | Bruinsma et al. |
| 8,523,781 | B2 | 9/2013 | Al-Ali |
| D692,145 | S | 10/2013 | Al-Ali et al. |
| 8,571,617 | B2 | 10/2013 | Reichgott et al. |
| 8,571,618 | B1 | 10/2013 | Lamego et al. |
| 8,571,619 | B2 | 10/2013 | Al-Ali et al. |
| 8,577,431 | B2 | 11/2013 | Lamego et al. |
| 8,584,345 | B2 | 11/2013 | Al-Ali et al. |
| 8,588,880 | B2 | 11/2013 | Abdul-Hafiz et al. |
| 8,630,691 | B2 | 1/2014 | Lamego et al. |
| 8,641,631 | B2 | 2/2014 | Sierra et al. |
| 8,652,060 | B2 | 2/2014 | Al-Ali |
| 8,666,468 | B1 | 3/2014 | Ai-Ai |
| 8,670,811 | B2 | 3/2014 | O'Reilly |
| RE44,823 | E | 4/2014 | Parker |
| RE44,875 | E | 4/2014 | Kiani et al. |
| 8,688,183 | B2 | 4/2014 | Bruinsma et al. |
| 8,690,799 | B2 | 4/2014 | Telfort et al. |
| 8,702,627 | B2 | 4/2014 | Telfort et al. |
| 8,712,494 | B1 | 4/2014 | MacNeish, III et al. |
| 8,715,206 | B2 | 5/2014 | Telfort et al. |
| 8,723,677 | B1 | 5/2014 | Kiani |
| 8,740,792 | B1 | 6/2014 | Kiani et al. |
| 8,755,535 | B2 | 6/2014 | Telfort et al. |
| 8,755,872 | B1 | 6/2014 | Marinow |
| 8,764,671 | B2 | 7/2014 | Kiani |
| 8,768,423 | B2 | 7/2014 | Shakespeare et al. |
| 8,771,204 | B2 | 7/2014 | Telfort et al. |
| 8,781,544 | B2 | 7/2014 | Al-Ali et al. |
| 8,790,268 | B2 | 7/2014 | Al-Ali |
| 8,801,613 | B2 | 8/2014 | Al-Ali et al. |
| 8,821,397 | B2 | 9/2014 | Al-Ali et al. |
| 8,821,415 | B2 | 9/2014 | Al-Ali et al. |
| 8,830,449 | B1 | 9/2014 | Lamego et al. |
| 8,840,549 | B2 | 9/2014 | Al-Ali et al. |
| 8,852,094 | B2 | 10/2014 | Al-Ali et al. |
| 8,852,994 | B2 | 10/2014 | Wojtczuk et al. |
| 8,897,847 | B2 | 11/2014 | Al-Ali |
| 8,911,377 | B2 | 12/2014 | Al-Ali |
| 8,989,831 | B2 | 3/2015 | Al-Ali et al. |
| 8,998,809 | B2 | 4/2015 | Kiani |
| 9,066,666 | B2 | 6/2015 | Kiani |
| 9,066,680 | B1 | 6/2015 | Al-Ali et al. |
| 9,095,316 | B2 | 8/2015 | Welch et al. |
| 9,106,038 | B2 | 8/2015 | Telfort et al. |
| 9,107,625 | B2 | 8/2015 | Telfort et al. |
| 9,131,881 | B2 | 9/2015 | Diab et al. |
| 9,138,180 | B1 | 9/2015 | Coverston et al. |
| 9,153,112 | B1 | 10/2015 | Kiani et al. |
| 9,192,329 | B2 | 11/2015 | Al-Ali |
| 9,192,351 | B1 | 11/2015 | Telfort et al. |
| 9,195,385 | B2 | 11/2015 | Al-Ali et al. |
| 9,211,095 | B1 | 12/2015 | Al-Ali |
| 9,218,454 | B2 | 12/2015 | Kiani et al. |
| 9,245,668 | B1 | 1/2016 | Vo et al. |
| 9,267,572 | B2 | 2/2016 | Barker et al. |
| 9,277,880 | B2 | 3/2016 | Poeze et al. |
| 9,307,928 | B1 | 4/2016 | Al-Ali et al. |
| 9,323,894 | B2 | 4/2016 | Kiani |
| D755,392 | S | 5/2016 | Hwang et al. |
| 9,326,712 | B1 | 5/2016 | Kiani |
| 9,392,945 | B2 | 7/2016 | Al-Ali et al. |
| 9,408,542 | B1 | 8/2016 | Kinast et al. |
| 9,436,645 | B2 | 9/2016 | Al-Ali et al. |
| 9,445,759 | B1 | 9/2016 | Lamego et al. |
| 9,474,474 | B2 | 10/2016 | Lamego et al. |
| 9,480,435 | B2 | 11/2016 | Olsen |
| 9,497,530 | B1 | 11/2016 | Campbell et al. |
| 9,510,779 | B2 | 12/2016 | Poeze et al. |
| 9,517,024 | B2 | 12/2016 | Kiani et al. |
| 9,532,722 | B2 | 1/2017 | Lamego et al. |
| 9,560,996 | B2 | 2/2017 | Kiani |
| 9,579,039 | B2 | 2/2017 | Jansen et al. |
| 9,622,692 | B2 | 4/2017 | Lamego et al. |
| D788,312 | S | 5/2017 | Al-Ali et al. |
| 9,649,054 | B2 | 5/2017 | Lamego et al. |
| 9,697,928 | B2 | 7/2017 | Al-Ali et al. |
| 9,717,458 | B2 | 8/2017 | Lamego et al. |
| 9,724,016 | B1 | 8/2017 | Al-Ali et al. |
| 9,724,024 | B2 | 8/2017 | Al-Ali |
| 9,724,025 | B1 | 8/2017 | Kiani et al. |
| 9,749,232 | B2 | 8/2017 | Sampath et al. |
| 9,750,442 | B2 | 9/2017 | Olsen |
| 9,750,461 | B1 | 9/2017 | Telfort |
| 9,775,545 | B2 | 10/2017 | Al-Ali et al. |
| 9,778,079 | B1 | 10/2017 | Al-Ali et al. |
| 9,782,077 | B2 | 10/2017 | Lamego et al. |
| 9,787,568 | B2 | 10/2017 | Lamego et al. |
| 9,808,188 | B1 | 11/2017 | Perea et al. |
| 9,832,576 | B2 | 11/2017 | Jensen et al. |
| 9,839,379 | B2 | 12/2017 | Al-Ali et al. |
| 9,839,381 | B1 | 12/2017 | Weber et al. |
| 9,847,749 | B2 | 12/2017 | Kiani et al. |
| 9,848,800 | B1 | 12/2017 | Lee et al. |
| 9,861,298 | B2 | 1/2018 | Eckerbom et al. |
| 9,861,305 | B1 | 1/2018 | Weber et al. |
| 9,877,650 | B2 | 1/2018 | Muhsin et al. |
| 9,891,079 | B2 | 2/2018 | Dalvi |
| 9,924,897 | B1 | 3/2018 | Abdul-Hafiz |
| 9,936,917 | B2 | 4/2018 | Poeze et al. |
| 9,955,937 | B2 | 5/2018 | Telfort |
| 9,965,946 | B2 | 5/2018 | Al-Ali et al. |
| D820,865 | S | 6/2018 | Muhsin et al. |
| 9,986,952 | B2 | 6/2018 | Dalvi et al. |
| D822,215 | S | 7/2018 | Al-Ali et al. |
| D822,216 | S | 7/2018 | Barker et al. |
| 10,010,276 | B2 | 7/2018 | Al-Ali et al. |
| 10,086,138 | B1 | 10/2018 | Novak, Jr. |
| 10,111,591 | B2 | 10/2018 | Dyell et al. |

(56) References Cited

U.S. PATENT DOCUMENTS

D833,624 S 11/2018 DeJong et al.
10,123,729 B2 11/2018 Dyell et al.
D835,282 S 12/2018 Barker et al.
D835,283 S 12/2018 Barker et al.
D835,284 S 12/2018 Barker et al.
D835,285 S 12/2018 Barker et al.
10,149,616 B2 12/2018 Al-Ali et al.
10,154,815 B2 12/2018 Al-Ali et al.
10,159,412 B2 12/2018 Lamego et al.
10,165,345 B2 12/2018 Slater et al.
10,181,328 B2 1/2019 Jensen et al.
10,188,348 B2 1/2019 Al-Ali et al.
RE47,218 E 2/2019 Al-Ali
RE47,244 E 2/2019 Kiani et al.
RE47,249 E 2/2019 Kiani et al.
10,205,291 B2 2/2019 Scruggs et al.
10,224,975 B2 3/2019 Petersen et al.
10,226,187 B2 3/2019 Al-Ali et al.
10,231,657 B2 3/2019 Al-Ali et al.
10,231,670 B2 3/2019 Blank et al.
RE47,353 E 4/2019 Kiani et al.
10,279,247 B2 5/2019 Kiani
10,292,664 B2 5/2019 Al-Ali
10,299,720 B2 5/2019 Brown et al.
10,327,337 B2 6/2019 Schmidt et al.
10,327,713 B2 6/2019 Barker et al.
10,332,630 B2 6/2019 Ai-Ali
10,383,520 B2 8/2019 Wojtczuk et al.
10,383,527 B2 8/2019 Ai-Ali
10,388,120 B2 8/2019 Muhsin et al.
D864,120 S 10/2019 Forrest et al.
10,441,181 B1 10/2019 Telfort et al.
10,441,196 B2 10/2019 Eckerbom et al.
10,448,844 B2 10/2019 Al-Ali et al.
10,448,871 B2 10/2019 Al-Ali et al.
10,456,038 B2 10/2019 Lamego et al.
10,463,340 B2 11/2019 Telfort et al.
10,471,159 B1 11/2019 Lapotko et al.
10,505,311 B2 12/2019 Al-Ali et al.
10,524,738 B2 1/2020 Olsen
10,532,174 B2 1/2020 Al-Ali
10,536,763 B2 1/2020 Slater et al.
10,537,285 B2 1/2020 Shreim et al.
10,542,903 B2 1/2020 Al-Ali et al.
10,555,678 B2 2/2020 Dalvi et al.
10,568,553 B2 2/2020 O'Neil et al.
10,608,817 B2 3/2020 Haider et al.
D880,477 S 4/2020 Forrest et al.
10,617,302 B2 4/2020 Al-Ali et al.
10,617,335 B2 4/2020 Al-Ali et al.
10,637,181 B2 4/2020 Al-Ali et al.
D886,849 S 6/2020 Muhsin et al.
D887,548 S 6/2020 Abdul-Hafiz et al.
D887,549 S 6/2020 Abdul-Hafiz et al.
10,667,764 B2 6/2020 Ahmed et al.
10,674,269 B2 6/2020 Riha
D890,708 S 7/2020 Forrest et al.
10,721,785 B2 7/2020 Al-Ali
10,736,518 B2 8/2020 Al-Ali et al.
10,750,984 B2 8/2020 Pauley et al.
D897,098 S 9/2020 Al-Ali
10,779,098 B2 9/2020 Iswanto et al.
10,827,961 B1 11/2020 Iyengar et al.
10,828,007 B1 11/2020 Telfort et al.
10,832,818 B2 11/2020 Muhsin et al.
10,849,554 B2 12/2020 Shreim et al.
10,856,750 B2 12/2020 Indorf
D906,970 S 1/2021 Forrest et al.
D908,213 S 1/2021 Abdul-Hafiz et al.
10,918,281 B2 2/2021 Al-Ali et al.
10,932,705 B2 3/2021 Muhsin et al.
10,932,729 B2 3/2021 Kiani et al.
10,939,878 B2 3/2021 Kiani et al.
10,956,950 B2 3/2021 Al-Ali et al.
D916,135 S 4/2021 Indorf et al.
D917,046 S 4/2021 Abdul-Hafiz et al.
D917,550 S 4/2021 Indorf et al.
D917,564 S 4/2021 Indorf et al.
D917,704 S 4/2021 Al-Ali et al.
10,987,066 B2 4/2021 Chandran et al.
10,991,135 B2 4/2021 Al-Ali et al.
D919,094 S 5/2021 Al-Ali et al.
D919,100 S 5/2021 Al-Ali et al.
11,006,867 B2 5/2021 Al-Ali
D921,202 S 6/2021 Al-Ali et al.
11,024,064 B2 6/2021 Muhsin et al.
11,026,604 B2 6/2021 Chen et al.
D925,597 S 7/2021 Chandran et al.
D927,699 S 8/2021 Al-Ali et al.
11,076,777 B2 8/2021 Lee et al.
11,114,188 B2 9/2021 Poeze et al.
D933,232 S 10/2021 Al-Ali et al.
D933,233 S 10/2021 Al-Ali et al.
D933,234 S 10/2021 Al-Ali et al.
11,145,408 B2 10/2021 Sampath et al.
11,147,518 B1 10/2021 Al-Ali et al.
11,185,262 B2 11/2021 Al-Ali et al.
11,191,484 B2 12/2021 Kiani et al.
D946,596 S 3/2022 Ahmed
D946,597 S 3/2022 Ahmed
D946,598 S 3/2022 Ahmed
D946,617 S 3/2022 Ahmed
11,272,286 B2 3/2022 Eronen et al.
11,272,839 B2 3/2022 Al-Ali et al.
11,289,199 B2 3/2022 Al-Ali
RE49,034 E 4/2022 Ai-Ali
11,298,021 B2 4/2022 Muhsin et al.
D950,580 S 5/2022 Ahmed
D950,599 S 5/2022 Ahmed
D950,738 S 5/2022 Al-Ali et al.
11,375,058 B2 6/2022 Kuzhiyil
D957,648 S 7/2022 Al-Ali
11,382,567 B2 7/2022 O'Brien et al.
11,389,093 B2 7/2022 Triman et al.
11,406,286 B2 8/2022 Al-Ali et al.
11,417,347 B2 8/2022 Johnson et al.
11,417,426 B2 8/2022 Muhsin et al.
11,439,329 B2 9/2022 Lamego
11,445,948 B2 9/2022 Scruggs et al.
D965,789 S 10/2022 Al-Ali et al.
D967,433 S 10/2022 Al-Ali et al.
11,464,410 B2 10/2022 Muhsin
11,496,842 B2 11/2022 Wexler et al.
11,504,058 B1 11/2022 Sharma et al.
11,504,066 B1 11/2022 Dalvi et al.
D971,933 S 12/2022 Ahmed
D973,072 S 12/2022 Ahmed
D973,685 S 12/2022 Ahmed
D973,686 S 12/2022 Ahmed
D974,193 S 1/2023 Forrest et al.
D979,516 S 2/2023 Al-Ali et al.
D980,091 S 3/2023 Forrest et al.
11,596,363 B2 3/2023 Lamego
11,622,188 B1 4/2023 Perrin
11,627,919 B2 4/2023 Kiani et al.
11,637,437 B2 4/2023 Al-Ali et al.
D985,498 S 5/2023 Al-Ali et al.
11,653,862 B2 5/2023 Dalvi et al.
D989,112 S 6/2023 Muhsin et al.
D989,327 S 6/2023 Al-Ali et al.
11,678,829 B2 6/2023 Al-Ali et al.
11,679,579 B2 6/2023 Al-Ali
11,684,296 B2 6/2023 Vo et al.
11,692,934 B2 7/2023 Normand et al.
11,701,043 B2 7/2023 Al-Ali et al.
D997,365 S 8/2023 Hwang
11,721,105 B2 8/2023 Ranasinghe et al.
11,730,379 B2 8/2023 Ahmed et al.
D998,625 S 9/2023 Indorf et al.
D998,630 S 9/2023 Indorf et al.
D998,631 S 9/2023 Indorf et al.
D999,244 S 9/2023 Indorf et al.
D999,245 S 9/2023 Indorf et al.
D999,246 S 9/2023 Indorf et al.

(56) References Cited

U.S. PATENT DOCUMENTS 11,766,198 B2 9/2023 Pauley et al.
D1,000,975 S 10/2023 Al-Ali et al.
11,803,623 B2 10/2023 Kiani et al.
11,832,940 B2 12/2023 Diab et al.
D1,013,179 S 1/2024 Al-Ali et al.
11,872,156 B2 1/2024 Telfort et al.
11,879,960 B2 1/2024 Ranasinghe et al.
11,883,129 B2 1/2024 Olsen
D1,022,729 S 4/2024 Forrest et al.
11,951,186 B2 4/2024 Krishnamani et al.
11,974,833 B2 5/2024 Forrest et al.
11,986,067 B2 5/2024 Al-Ali et al.
11,986,289 B2 5/2024 Dalvi et al.
11,986,305 B2 5/2024 Al-Ali et al.
D1,031,729 S 6/2024 Forrest et al.
12,004,869 B2 6/2024 Kiani et al.
12,014,328 B2 6/2024 Wachman et al.
D1,036,293 S 7/2024 Al-Ali et al.
D1,037,462 S 7/2024 Al-Ali et al.
12,029,844 B2 7/2024 Pauley et al.
12,048,534 B2 7/2024 Vo et al.
12,064,217 B2 8/2024 Ahmed et al.
12,066,426 B1 8/2024 Lapotko et al.
D1,041,511 S 9/2024 Indorf et al.
D1,042,596 S 9/2024 DeJong et al.
D1,042,852 S 9/2024 Hwang
12,076,159 B2 9/2024 Belur Nagaraj et al.
12,082,926 B2 9/2024 Sharma et al.
D1,044,828 S 10/2024 Chandran et al.
D1,048,571 S 10/2024 Yu et al.
D1,048,908 S 10/2024 Al-Ali et al.
12,106,752 B2 10/2024 Campbell et al.
12,114,974 B2 10/2024 Al-Ali et al.
12,126,683 B2 10/2024 Koo et al.
12,127,838 B2 10/2024 Olsen et al.
12,128,213 B2 10/2024 Kiani et al.
12,131,661 B2 10/2024 Pauley et al.
D1,050,910 S 11/2024 Al-Ali et al.
12,178,572 B1 12/2024 Pauley et al.
12,178,581 B2 12/2024 Telfort et al.
12,178,852 B2 12/2024 Kiani et al.
D1,057,159 S 1/2025 DeJong et al.
D1,057,160 S 1/2025 DeJong et al.
12,198,790 B1 1/2025 Al-Ali
12,200,421 B2 1/2025 Campbell et al.
12,207,901 B1 1/2025 Lapotko et al.
D1,060,680 S 2/2025 Al-Ali et al.
D1,061,585 S 2/2025 Indorf
D1,063,893 S 2/2025 DeJong et al.
12,220,207 B2 2/2025 Telfort et al.
12,235,941 B2 2/2025 Kiani et al.
12,236,767 B2 2/2025 Muhsin
D1,066,244 S 3/2025 Lim et al.
D1,066,672 S 3/2025 Al-Ali et al.
D1,068,656 S 4/2025 Trevisan et al.
D1,071,195 S 4/2025 Seung
D1,072,836 S 4/2025 Indorf
D1,072,837 S 4/2025 Ahmed et al.
12,272,445 B1 4/2025 Kiani
D1,078,689 S 6/2025 Hwang
D1,079,020 S 6/2025 Hwang
12,336,796 B2 6/2025 Al-Ali
D1,083,653 S 7/2025 DeJong et al.
D1,085,102 S 7/2025 Indorf et al.
12,362,596 B2 7/2025 Barker et al.
12,390,114 B2 8/2025 Novak, Jr. et al.
D1,092,244 S 9/2025 DeJong et al.
D1,093,406 S 9/2025 Indorf et al.
D1,094,735 S 9/2025 DeJong et al.
D1,095,288 S 9/2025 Lim
D1,095,483 S 9/2025 DeJong et al.
12,433,524 B2 10/2025 Al-Ali et al.
12,440,128 B2 10/2025 Al-Ali et al.
2001/0034477 A1 10/2001 Mansfield et al.
2001/0039483 A1 11/2001 Brand et al.
2002/0010401 A1 1/2002 Bushmakin et al.
2002/0058864 A1 5/2002 Mansfield et al.
2002/0133080 A1 9/2002 Apruzzese et al.
2003/0013975 A1 1/2003 Kiani
2003/0018243 A1 1/2003 Gerhardt et al.
2003/0144582 A1 7/2003 Cohen et al.
2003/0156288 A1 8/2003 Barnum et al.
2003/0212312 A1 11/2003 Coffin, IV et al.
2004/0106163 A1 6/2004 Workman, Jr. et al.
2005/0055276 A1 3/2005 Kiani et al.
2005/0100182 A1 5/2005 Sykes et al.
2005/0234317 A1 10/2005 Kiani
2006/0073719 A1 4/2006 Kiani
2006/0189871 A1 8/2006 Al-Ali et al.
2007/0073116 A1 3/2007 Kiani et al.
2007/0180140 A1 8/2007 Welch et al.
2007/0244377 A1 10/2007 Cozad et al.
2008/0056517 A1 3/2008 Algazi et al.
2008/0064965 A1 3/2008 Jay et al.
2008/0094228 A1 4/2008 Welch et al.
2008/0103375 A1 5/2008 Kiani
2008/0221418 A1 9/2008 Al-Ali et al.
2009/0036759 A1 2/2009 Ault et al.
2009/0074203 A1 3/2009 Bradford et al.
2009/0093687 A1 4/2009 Telfort et al.
2009/0095926 A1 4/2009 MacNeish, III
2009/0247984 A1 10/2009 Lamego et al.
2009/0275844 A1 11/2009 Al-Ali
2010/0004518 A1 1/2010 Vo et al.
2010/0030040 A1 2/2010 Poeze et al.
2010/0099964 A1 4/2010 O'Reilly et al.
2010/0195836 A1 8/2010 Platz
2010/0234718 A1 9/2010 Sampath et al.
2010/0270257 A1 10/2010 Wachman et al.
2011/0028806 A1 2/2011 Merritt et al.
2011/0028809 A1 2/2011 Goodman
2011/0040197 A1 2/2011 Welch et al.
2011/0082711 A1 4/2011 Poeze et al.
2011/0087081 A1 4/2011 Kiani et al.
2011/0118561 A1 5/2011 Tari et al.
2011/0137297 A1 6/2011 Kiani et al.
2011/0172498 A1 7/2011 Olsen et al.
2011/0274284 A1 11/2011 Mulder
2012/0123231 A1 5/2012 O'Reilly
2012/0165629 A1 6/2012 Merritt et al.
2012/0209084 A1 8/2012 Olsen et al.
2012/0226117 A1 9/2012 Lamego et al.
2012/0283524 A1 11/2012 Kiani et al.
2013/0023775 A1 1/2013 Lamego et al.
2013/0060147 A1 3/2013 Welch et al.
2013/0096405 A1 4/2013 Garfio
2013/0296672 A1 11/2013 O'Neil et al.
2013/0345921 A1 12/2013 Al-Ali et al.
2014/0166076 A1 6/2014 Kiani et al.
2014/0180160 A1 6/2014 Brown et al.
2014/0187973 A1 7/2014 Brown et al.
2014/0275871 A1 9/2014 Lamego et al.
2014/0275872 A1 9/2014 Merritt et al.
2014/0316217 A1 10/2014 Purdon et al.
2014/0316218 A1 10/2014 Purdon et al.
2014/0321682 A1 10/2014 Kofod-Hansen et al.
2014/0323897 A1 10/2014 Brown et al.
2014/0323898 A1 10/2014 Purdon et al.
2015/0005600 A1 1/2015 Blank et al.
2015/0011907 A1 1/2015 Purdon et al.
2015/0073241 A1 3/2015 Lamego
2015/0080754 A1 3/2015 Purdon et al.
2015/0099950 A1 4/2015 Al-Ali et al.
2017/0024748 A1 1/2017 Haider
2017/0251974 A1 9/2017 Shreim et al.
2018/0054683 A1 2/2018 Pedersen et al.
2018/0242926 A1 8/2018 Muhsin et al.
2018/0247712 A1 8/2018 Muhsin et al.
2019/0320906 A1 10/2019 Olsen
2020/0111552 A1 4/2020 Ahmed
2020/0113520 A1 4/2020 Abdul-Hafiz et al.
2020/0138368 A1 5/2020 Kiani et al.
2020/0163597 A1 5/2020 Dalvi et al.
2020/0253474 A1 8/2020 Muhsin et al.

(56) References Cited

U.S. PATENT DOCUMENTS

| | | | |
|---|---|---|---|
| 2020/0253544 A1 | 8/2020 | Belur Nagaraj et al. | |
| 2020/0275841 A1 | 9/2020 | Telfort et al. | |
| 2020/0288983 A1 | 9/2020 | Telfort et al. | |
| 2020/0329983 A1 | 10/2020 | Al-Ali et al. | |
| 2020/0329993 A1 | 10/2020 | Al-Ali et al. | |
| 2021/0022628 A1 | 1/2021 | Telfort et al. | |
| 2021/0104173 A1 | 4/2021 | Pauley et al. | |
| 2021/0117525 A1 | 4/2021 | Kiani et al. | |
| 2021/0121582 A1 | 4/2021 | Krishnamani et al. | |
| 2021/0161465 A1 | 6/2021 | Barker et al. | |
| 2021/0236729 A1 | 8/2021 | Kiani et al. | |
| 2021/0274296 A1* | 9/2021 | Rohde .................... | H04R 25/30 |
| 2021/0275101 A1 | 9/2021 | Vo et al. | |
| 2021/0290072 A1 | 9/2021 | Forrest | |
| 2021/0290080 A1 | 9/2021 | Ahmed | |
| 2021/0290120 A1 | 9/2021 | Al-Ali | |
| 2021/0290177 A1 | 9/2021 | Novak, Jr. | |
| 2021/0290184 A1 | 9/2021 | Ahmed | |
| 2021/0296008 A1 | 9/2021 | Novak, Jr. | |
| 2021/0330228 A1 | 10/2021 | Olsen et al. | |
| 2021/0383011 A1 | 12/2021 | Campbell et al. | |
| 2021/0386382 A1 | 12/2021 | Olsen et al. | |
| 2021/0402110 A1 | 12/2021 | Pauley et al. | |
| 2021/0409534 A1 | 12/2021 | Kuzhiyil | |
| 2022/0039707 A1 | 2/2022 | Sharma et al. | |
| 2022/0053892 A1 | 2/2022 | Al-Ali et al. | |
| 2022/0070604 A1 | 3/2022 | Campbell et al. | |
| 2022/0071562 A1 | 3/2022 | Kiani | |
| 2022/0096603 A1 | 3/2022 | Kiani et al. | |
| 2022/0151521 A1 | 5/2022 | Krishnamani et al. | |
| 2022/0218244 A1 | 7/2022 | Kiani et al. | |
| 2022/0287574 A1 | 9/2022 | Telfort et al. | |
| 2022/0296161 A1 | 9/2022 | Al-Ali et al. | |
| 2022/0361819 A1 | 11/2022 | Al-Ali et al. | |
| 2022/0379059 A1 | 12/2022 | Yu et al. | |
| 2022/0392610 A1 | 12/2022 | Kiani et al. | |
| 2023/0028745 A1 | 1/2023 | Al-Ali | |
| 2023/0038389 A1 | 2/2023 | Vo | |
| 2023/0045647 A1 | 2/2023 | Vo | |
| 2023/0058052 A1 | 2/2023 | Al-Ali | |
| 2023/0058342 A1 | 2/2023 | Kiani | |
| 2023/0069789 A1 | 3/2023 | Koo et al. | |
| 2023/0087671 A1 | 3/2023 | Telfort et al. | |
| 2023/0110152 A1 | 4/2023 | Forrest et al. | |
| 2023/0111198 A1 | 4/2023 | Yu et al. | |
| 2023/0115397 A1 | 4/2023 | Vo et al. | |
| 2023/0116371 A1 | 4/2023 | Mills et al. | |
| 2023/0135297 A1 | 5/2023 | Kiani et al. | |
| 2023/0138098 A1 | 5/2023 | Telfort et al. | |
| 2023/0145155 A1 | 5/2023 | Krishnamani et al. | |
| 2023/0147750 A1 | 5/2023 | Barker et al. | |
| 2023/0210417 A1 | 7/2023 | Al-Ali et al. | |
| 2023/0222805 A1 | 7/2023 | Muhsin et al. | |
| 2023/0222887 A1 | 7/2023 | Muhsin et al. | |
| 2023/0226331 A1 | 7/2023 | Kiani et al. | |
| 2023/0284916 A1 | 9/2023 | Telfort | |
| 2023/0284943 A1 | 9/2023 | Scruggs et al. | |
| 2023/0298561 A1 | 9/2023 | Swaminathan et al. | |
| 2023/0301562 A1 | 9/2023 | Scruggs et al. | |
| 2023/0346993 A1 | 11/2023 | Kiani et al. | |
| 2023/0368221 A1 | 11/2023 | Haider | |
| 2023/0371893 A1 | 11/2023 | Al-Ali et al. | |
| 2023/0389837 A1 | 12/2023 | Krishnamani et al. | |
| 2024/0016418 A1 | 1/2024 | Devadoss et al. | |
| 2024/0016419 A1 | 1/2024 | Devadoss et al. | |
| 2024/0047061 A1 | 2/2024 | Al-Ali et al. | |
| 2024/0049310 A1 | 2/2024 | Al-Ali et al. | |
| 2024/0049986 A1 | 2/2024 | Al-Ali et al. | |
| 2024/0081656 A1 | 3/2024 | DeJong et al. | |
| 2024/0122486 A1 | 4/2024 | Kiani | |
| 2024/0180456 A1 | 6/2024 | Ai-Ali | |
| 2024/0188872 A1 | 6/2024 | Al-Ali et al. | |
| 2024/0245855 A1 | 7/2024 | Vo et al. | |
| 2024/0260894 A1 | 8/2024 | Olsen | |
| 2024/0267698 A1 | 8/2024 | Telfort et al. | |
| 2024/0277233 A1 | 8/2024 | Al-Ali | |
| 2024/0277280 A1 | 8/2024 | Ai-Ali | |
| 2024/0298920 A1 | 9/2024 | Fernkbist et al. | |
| 2024/0306985 A1 | 9/2024 | Vo et al. | |
| 2024/0324953 A1 | 10/2024 | Telfort | |
| 2024/0380246 A1 | 11/2024 | Moran | |
| 2024/0380247 A1 | 11/2024 | Moran | |
| 2024/0404549 A1 | 12/2024 | Campbell et al. | |
| 2025/0000458 A1 | 1/2025 | Abdul-Hafiz et al. | |
| 2025/0037836 A1 | 1/2025 | Kiani | |
| 2025/0100482 A1 | 3/2025 | Al-Ali et al. | |
| 2025/0118415 A1 | 4/2025 | Olsen | |
| 2025/0255764 A1 | 8/2025 | Stead | |
| 2025/0278512 A1 | 9/2025 | Koo et al. | |
| 2025/0281059 A1 | 9/2025 | Avendano | |
| 2025/0288250 A1 | 9/2025 | Al-Ali et al. | |
| 2025/0295366 A1 | 9/2025 | Al-Ali et al. | |
| 2025/0302426 A1 | 10/2025 | Ha et al. | |
| 2025/0311949 A1 | 10/2025 | Al-Ali et al. | |

FOREIGN PATENT DOCUMENTS

| | | |
|---|---|---|
| EP | 2 838 210 | 7/2020 |
| WO | WO 2008/098590 | 8/2008 |

* cited by examiner

400B

400C

400D

400E

SYSTEMS FOR USING AN AURICULAR DEVICE CONFIGURED WITH AN INDICATOR AND BEAMFORMER FILTER UNIT

CROSS-REFERENCE TO RELATED APPLICATIONS

This application claims benefit of U.S. Provisional Patent Application No. 63/483,491 filed Feb. 6, 2023, and titled "SYSTEMS FOR USING AN AURICULAR DEVICE CONFIGURED WITH AN INDICATOR AND BEAMFORMER FILTER UNIT." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to devices, methods, and/or systems for monitoring a user's physiological information using an auricular device configured with an indicator and a beamformer filter unit.

BACKGROUND

Hospitals, nursing homes, and other patient care facilities typically utilize a number of sensors, devices, and/or monitors to collect or analyze a user's (which may also be referred to as a "subject", "wearer," "individual" or "patient" and/or the like) physiological parameters such as blood oxygen saturation level, temperature, respiratory rate, pulse rate, blood pressure, and the like. Such devices can include, for example, acoustic sensors, electroencephalogram (EEG) sensors, electrocardiogram (ECG) devices, blood pressure monitors, temperature sensors, and pulse oximeters, among others. In medical environments, various sensors/devices (such as those just mentioned) can be attached to a patient and connected to one or more patient monitoring devices using cables or via wireless connection. Patient monitoring devices generally include sensors, processing equipment, and displays for obtaining and analyzing a medical patient's physiological parameters. Clinicians, including doctors, nurses, and other medical personnel, use the physiological parameters obtained from patient monitors to determine a patient's physiological status, diagnose illnesses, and to prescribe treatments. Clinicians also use the physiological parameters to monitor patients during various clinical situations to determine whether to increase the level of medical care given to patients.

SUMMARY

In some aspects, the techniques described herein relate to a system including: an external device configured to transmit a first audio data to an ear-bud, the first audio data corresponding to a sound received form an audio source, wherein the external device is at a first location with respect to the audio source; and the ear-bud configured to be positioned within an ear canal of a user, the ear-bud including: a microphone configured to generate audio data responsive to detecting audio; a storage device, configured to store computer-executable instructions; and one or more processors in communication with the storage device, wherein the computer-executable instructions, when executed by the one or more processors, cause the one or more processors to: receive the first audio data from the external device; receive a second audio data from the microphone, wherein the second audio data corresponds to a sound received form the audio source, wherein the ear-bud is at a second location with respect to the audio source; estimate an acoustic environment based on the first audio data and the second audio data, the acoustic environment including at least a first distance between the ear-bud and the audio source, and a second distance between the external device and the audio source; generate a third audio data based on the acoustic environment, the first audio data, and the second audio data; and cause a speaker to emit the third audio data within the ear canal of the user, such that the user perceives a sound as originating from the second location and having an orientation of the ear-bud.

In some aspects, the techniques described herein relate to a system, wherein the computer-executable instructions, when executed by the one or more processors, further cause the one or more processors to: in response to receiving the first audio data and the second audio data, determine a first distance between the ear-bud and the audio source, and a second distance between the external device and the audio source; and determine a first orientation of the ear-bud, and a second orientation of the external device.

In some aspects, the techniques described herein relate to a system, wherein the ear-bud further includes: a second microphone configured to generate audio data responsive to detecting audio; and wherein the computer-executable instructions, when executed by the one or more processors, further cause the one or more processors to.

In some aspects, the techniques described herein relate to a system, wherein the external device further includes a first microphone and a second microphone configured to generate audio data responsive to detecting audio; and wherein the computer-executable instructions, when executed by the one or more processors, further cause the one or more processors to: determine the second distance based on a comparison of the first audio data received from the first microphone and the second microphone of the external device.

In some aspects, the techniques described herein relate to a system, wherein the first orientation includes an estimated heading of the ear-bud and a direction of the second audio data, and wherein the second orientation includes an estimated heading of the external device and a direction of the first audio data.

In some aspects, the techniques described herein relate to a system, wherein the third audio data is generated based on spatially processing the first audio data and the second audio data.

In some aspects, the techniques described herein relate to a system, wherein the first orientation of the ear-bud is generated at least in part by an IMU.

In some aspects, the techniques described herein relate to a system, wherein the external device is at least one of a case, a podium, or a desktop microphone.

In some aspects, the techniques described herein relate to an ear-bud configured to be positioned within an ear canal of a user, the ear-bud including: a microphone configured to generate audio data responsive to detecting audio; a storage device, configured to store computer-executable instructions; and one or more processors in communication with the storage device, wherein the computer-executable instructions, when executed by the one or more processors, cause the one or more processors to: receive a first audio data from an external device, the first audio data corresponding to a sound received form an audio source, wherein the external device is at a first location with respect to the audio source; receive a second audio data from the microphone, wherein the second audio data corresponds to a sound received form the audio source, wherein the ear-bud is at a second location with respect to the audio source; estimate an acoustic environment based on the first audio data and the second audio data, the acoustic environment including at least a first distance between the ear-bud and the audio source, and a second distance between the external device and the audio source; generate a third audio data based on the acoustic environment, the first audio data, and the second audio data; and cause a speaker to emit the third audio data within the ear canal of the user, such that the user perceives a sound as originating from the second location and having an orientation of the ear-bud.

In some aspects, the techniques described herein relate to an ear-bud, wherein the computer-executable instructions, when executed by the one or more processors, further cause the one or more processors to: in response to receiving the first audio data and the second audio data, determine the first distance between the ear-bud and the audio source, and the second distance between the external device and the audio source; and determine a first orientation of the ear-bud, and a second orientation of the external device.

In some aspects, the techniques described herein relate to an ear-bud, further including: a second microphone configured to generate audio data responsive to detecting audio; and wherein the computer-executable instructions, when executed by the one or more processors, further cause the one or more processors to: determine the first distance based on a comparison of the second audio data detected at the microphone and at the second microphone.

In some aspects, the techniques described herein relate to an ear-bud, wherein the computer-executable instructions, when executed by the one or more processors, further cause the one or more processors to: determine the second distance based on a comparison of the first audio data received from a first microphone and a second microphone of the external device.

In some aspects, the techniques described herein relate to an ear-bud, wherein the first orientation includes an estimated heading of the ear-bud and a direction of the second audio data, and wherein the second orientation includes an estimated heading of the external device and a direction of the first audio data.

In some aspects, the techniques described herein relate to an ear-bud, wherein the third audio data is generated based on spatially processing the first audio data and the second audio data.

In some aspects, the techniques described herein relate to an ear-bud, wherein the first orientation of the ear-bud is generated at least in part by an IMU.

In some aspects, the techniques described herein relate to an ear-bud, wherein the first audio data is received from a case, a podium, or a desktop microphone.

In some aspects, the techniques described herein relate to a method including: receiving a first audio data from an external device, the first audio data corresponding to a sound received form an audio source, wherein the external device is at a first location with respect to the audio source; receiving a second audio data from a microphone of an ear-bud, wherein the second audio data corresponds to a sound received form the audio source, wherein the ear-bud is at a second location with respect to the audio source; estimate an acoustic environment based on the first audio data and the second audio data, the acoustic environment including at least a first distance between the ear-bud and the audio source, and a second distance between the external device and the audio source; generate a third audio data based on the acoustic environment, the first audio data, and the second audio data; and cause a speaker to emit the third audio data within an ear canal of a user, such that the user perceives a sound as originating from the second location and having an orientation of the ear-bud.

In some aspects, the techniques described herein relate to a method, further including: in response to receiving the first audio data and the second audio data, determining a first distance between the ear-bud and the audio source, and a second distance between the external device and the audio source; and determining a first orientation of the ear-bud, and a second orientation of the external device.

In some aspects, the techniques described herein relate to a method, further including: wherein the first orientation of the ear-bud is generated at least in part by an IMU.

In some aspects, the techniques described herein relate to a method, wherein the third audio data is generated based on spatially processing the first audio data and the second audio data.

For purposes of summarizing the disclosure, certain aspects, advantages, and novel features are discussed herein. It is to be understood that not necessarily all such aspects, advantages, or features will be embodied in any particular embodiment of the disclosure, and an artisan would recognize from the disclosure herein a myriad of combinations of such aspects, advantages, or features.

BRIEF DESCRIPTION OF THE DRAWINGS

Example features of the present disclosure, its nature and various advantages will be apparent from the accompanying drawings and the following detailed description of various implementations. Non-limiting and non-exhaustive implementations are described with reference to the accompanying drawings, wherein like labels or reference numbers refer to like parts throughout the various views unless otherwise specified. The sizes and relative positions of elements in the drawings are not necessarily drawn to scale. For example, the shapes of various elements may be selected, enlarged, and positioned to improve drawing legibility. The particular shapes of the elements as drawn have been selected for ease of recognition in the drawings.

DETAILED DESCRIPTION

Figure 1A:
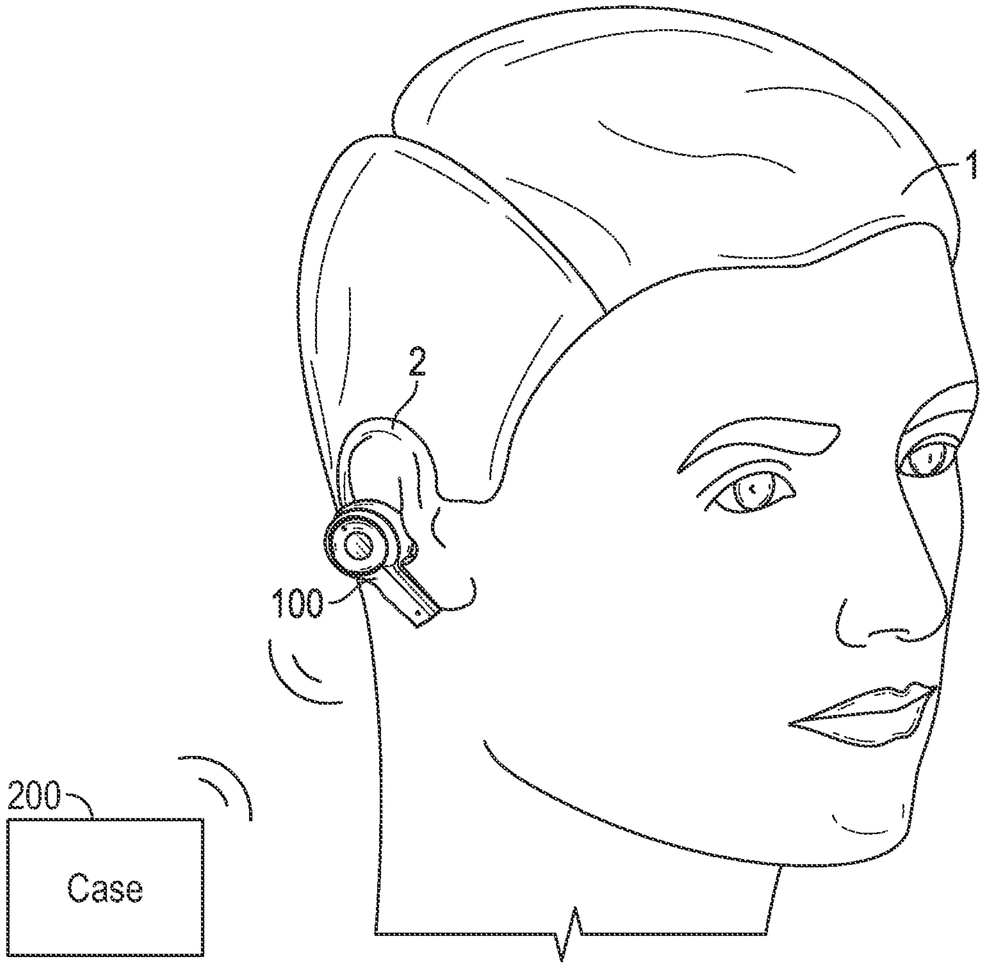
FIG. 1A illustrates an example auricular device secured to an ear of a user and a case for an auricular device.

Various features and advantages of this disclosure will now be described with reference to the accompanying figures. The following description is merely illustrative in nature and is in no way intended to limit the disclosure, its application, or uses. This disclosure extends beyond the specifically disclosed embodiments and/or uses and obvious modifications and equivalents thereof. Thus, it is intended that the scope of this disclosure should not be limited by any particular embodiments described below. The features of the illustrated embodiments can be modified, combined, removed, and/or substituted as will be apparent to those of ordinary skill in the art upon consideration of the principles disclosed herein.

I. Overview

Hearing loss affects almost half of the United States population over 65 years old. Aging and chronic exposure to loud noises can both contribute to hearing loss. Although there are steps to improve one's hearing, most types of hearing loss cannot be reversed. Several symptoms of hearing loss can include muffling speech and other words, difficulty understanding words especially against background noise or in a crowd, and trouble hearing consonants. Difficulty hearing can occur gradually and affect daily life, and a patient's hearing loss may vary from left ear to right ear. Moreover, patients suffering from hearing loss may require further monitoring of one or more physiological parameters. In addition to hearing loss, a patient may desire to monitor one or more physiological parameters such as the patient's oxygen saturation level and/or body temperature, and have such physiological parameters transmitted to the patient, medical professionals (providers), or to a medical database.

A patient desiring to address hearing loss may seek the care of a medical professional or hearing specialists. A medical professional or hearing specialists may suggest the patient use an auricular device such as a hearing aid, headphones, ear-bud, and/or the like. A typical hearing aid may not include several features desired by the patient and healthcare providers alike. For example, a typical hearing aid may not provide a patient with the ability to distinguish between an audio source (e.g., a speaker's voice, audio, and/or the like) and background noise. Additionally, the patient may desire that the hearing aid also monitor one or more physiological parameters of the patient and automatically report such information to the patient or medical professionals. Consequently, a typical hearing aid might not satisfy the needs of both patients and healthcare providers alike.

Accordingly, it may be desirable to provide a patient with an auricular device that may distinguish an audible signal form a target acoustic source (e.g., audio source), measure one or more physiological parameters of a user, and provide an indication of the one or more physiological parameters to the user and medical professionals alike.

II. Example Aspects Related to an Auricular Device

Figure 1B:
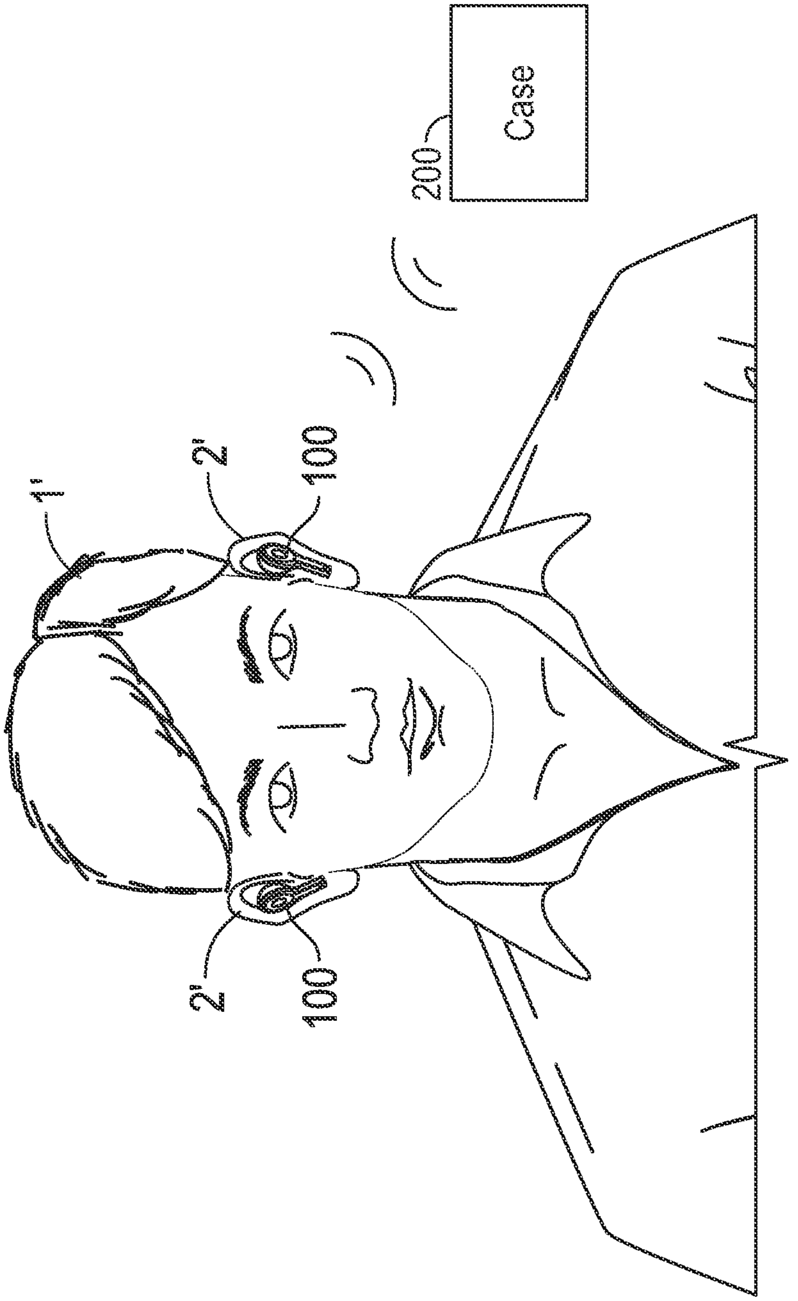
FIG. 1B illustrates an example pair of auricular devices secured to ears of a user and a case for an auricular device.

FIGS. 1A-1B illustrate an auricular device 100 (e.g., a hearing aid, headphones, ear-bud, and/or the like) secured to an ear 2 of a user 1 (which may also be referred to as a "subject", "wearer," or "patient" and/or the like) and an auricular device case 200 (hereinafter "case 200") to hold an auricular device 100 while not in use. Although FIG. 1A shows an auricular device 100 secured to the ear 2 in a particular manner, such illustrated manner and/or location of securement is not intended to be limiting. FIG. 1B illustrates two auricular devices 100, one secured to each ear 2' of a user 1' and a case 200. An auricular device 100 can be secured to any of a number of portions and/or locations relative to the ear 2. For example, an auricular device 100 can be secured to, placed adjacent, and/or positioned to be in contact with a pinna, a concha, an ear canal, a tragus, an antitragus, a helix, an antihelix, and/or another portion of the ear.

An auricular device 100 can be of various structural configurations and/or can include various structural features that can aid mechanical securement to any of such portions of the ear 2 and/or other portions of the user 1 (e.g., on or near portions of a head of the user 1). In some implementations, an auricular device 100 can be similar or identical to and/or incorporate any of the features described with respect to any of the devices described and/or illustrated in U.S. Pat. No. 10,536,763, filed May 3, 2017, titled "Headphone Ventilation," and/or can be similar or identical to and/or incorporate any of the features described with respect to any of the devices described and/or illustrated in U.S. Pat. No. 10,165,345, filed Jan. 4, 2017, titled "Headphones with Combined Ear-Cup and Ear-Bud," each of which are incorporated by reference herein in their entireties and form part of the present disclosure. In some implementations, auricular device 100 can be similar or identical to any of the devices described in U.S. Pat. Nos. 10,536,763 and/or 10,165,345 and also includes one or more of the features described with reference to FIG. 2A below (e.g., processor 102, storage device 104, communication module 106, information element 108, power source 110, oximetry sensor 112, accelerometer 114, gyroscope 116, temperature sensor(s) 118, other sensor(s) 120, microphone(s) 122, and/or speakers 124). Case 200 can include one or more of the features described with reference to FIG. 2B below (e.g., processor 102, storage device 104, communication module 106, information element 108, power source 110, oximetry sensor 112, accelerometer 114, gyroscope 116, temperature sensor(s) 118, other sensor(s) 120, microphone(s) 122, and/or speakers 124).

a. Example Aspects Related to Controller for an Auricular Device

Figure 2A:
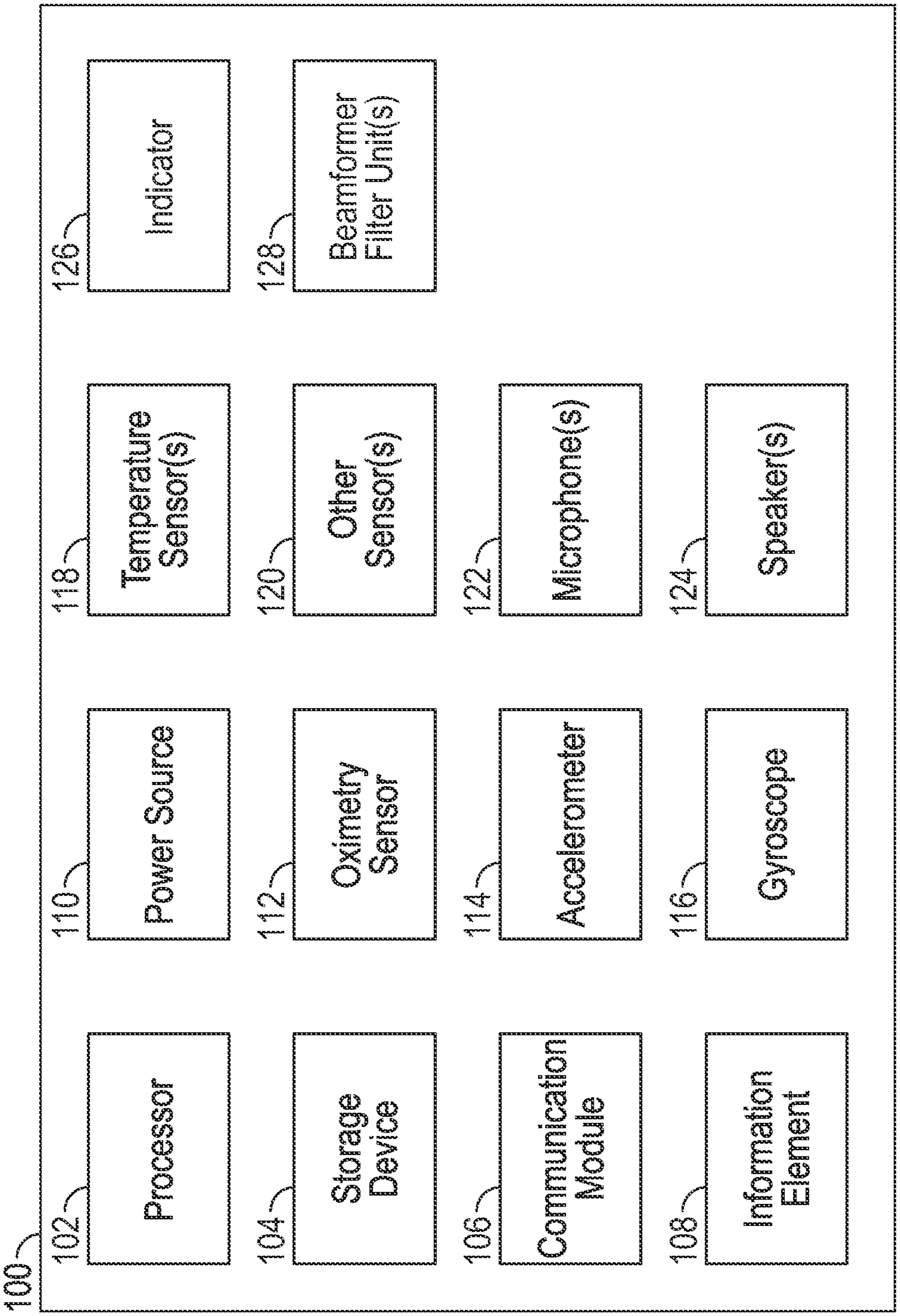
FIG. 2A illustrates an example block diagram of certain features of an auricular device.

FIG. 2A illustrates a schematic diagram of certain features which can be included in an auricular device 100. As shown, an auricular device 100 can include any or all of processor 102, storage device 104, communication module 106, and/or information element 108.

A processor 102 can be configured, among other things, to process data, execute instructions to perform one or more functions, and/or control the operation of an auricular device 100. For example, a processor 102 can process physiological data obtained from an auricular device 100 and can execute instructions to perform functions related to storing and/or transmitting such physiological data. For example, a processor 102 can process data received from one or more sensors of an auricular device 100, such as any or all of oximetry sensor 112, accelerometer 114, gyroscope 116, temperature sensor(s) 118, and/or any other sensor(s) 120 of the auricular device 100. A processor 102 can execute instructions to perform functions related to storing and/or transmitting any or all of such received data.

In some implementations, an auricular device 100 can be configured to adjust a sized and/or shape of a portion of the auricular device 100 to secure to an ear of a user. In some implementations, an auricular device 100 can include an ear canal portion configured to fit and/or secure within at least a portion of an ear canal of a user when the auricular device 100 is in use. In such implementations, an auricular device 100 can be configured to adjust a size and/or shape of such ear canal portion to secure within the user's ear canal. Such adjustment can be by inflating a portion of the ear canal portion, for example, or via an alternative mechanical means. In some implementations, an auricular device 100 includes an ear bud configured to fit and/or secure within the ear canal of a user, and in such implementations, the auricular device 100 can be configured to inflate the ear bud (or a portion thereof) to adjust a size and/or shape of the ear bud. In some implementations, an auricular device 100 includes an air intake and an air pump coupled to an inflatable portion of the auricular device 100 (e.g., of an ear bud) and configured to cause inflation in such manner.

A storage device 104 can include one or more memory devices that store data, including without limitation, dynamic and/or static random-access memory (RAM), programmable read-only memory (PROM), erasable programmable read-only memory (EPROM), electrically erasable programmable read-only memory (EEPROM), and the like. Such stored data can be processed and/or unprocessed physiological data or other types of data (e.g., motion and/or location data) obtained from an auricular device 100, for example. In some implementations, the storage device 104 can store information indicative and/or related to one or more users. For example, in some implementations of an auricular device 100 that are configured to cause inflation of a portion of the auricular device 100 within a user's ear canal as discussed above, the storage device 104 can store information related to a user inflation profile that can be utilized by the auricular device 100 to cause adjustment of a size and/or shape of such inflatable portion within the user's ear to a certain amount. In some implementations, as discussed elsewhere herein, an auricular device 100 can be configured to store information regarding one or more hearing aid profiles of users, and such information can be stored in storage device 104.

A communication module 106 can facilitate communicate (via wires and/or wireless connection) between an auricular device 100 (and/or components thereof) and external devices. For example, the communication module 106 can be configured to allow an auricular device 100 to wirelessly communicate with other devices, systems, and/or networks over any of a variety of communication protocols. A communication module 106 can be configured to use any of a variety of wireless communication protocols, such as Wi-Fi (802.11x), Bluetooth®, ZigBee®, Z-wave®, cellular telephony, infrared, near-field communications (NFC), RFID, satellite transmission, proprietary protocols, combinations of the same, and the like. A communication module 106 can allow data and/or instructions to be transmitted and/or received to and/or from an auricular device 100 and separate computing devices. A communication module 106 can be configured to transmit (e.g., wirelessly) processed and/or unprocessed physiological or other information to an external device (e.g., a separate computing device, a patient monitor, a mobile device (e.g., an iOS or Android enabled smartphone, tablet, laptop), a desktop computer, a server or other computing or processing device for display and/or further processing, and/or the like). Such separate computing devices can be configured to store and/or further process the received physiological and/or other information, to display information indicative of or derived from the received information, and/or to transmit information—including displays, alarms, alerts, and notifications—to various other types of computing devices and/or systems that may be associated with a hospital, a caregiver (e.g., a primary care provider), and/or a user (e.g., an employer, a school, friends, family) that have permission to access the user's data. As another example, the communication module 106 of an auricular device 100 can be configured to wirelessly transmit processed and/or unprocessed obtained physiological information and/or other information (e.g., motion and/or location data) to a mobile phone which can include one or more hardware processors configured to execute an application that generates a graphical user interface displaying information representative of the processed or unprocessed physiological and/or other information obtained from the auricular device 100. A communication module 106 can be and/or include a wireless transceiver.

In some implementations, an auricular device 100 includes an information element 108. An information element 108 can be a memory storage element that stores, in non-volatile memory, information used to help maintain a standard of quality associated with an auricular device 100. Illustratively, the information element 108 can store information regarding whether an auricular device 100 has been previously activated and/or whether the auricular device 100 has been previously operational for a prolonged period of time, such as, for example, one, two, three, four, five, six, seven or eight or more hours. Information stored in the information element 108 can be used to help detect improper re-use of an auricular device 100, for example.

With continued reference to FIG. 2A an auricular device 100 can include a power source 110. Power source 110 can be, for example, a battery. Such battery can be rechargeable or non-rechargeable. A power source 110 can provide power for the hardware components of an auricular device 100 described herein. A power source 110 can be, for example, a lithium battery. Additionally or alternatively, an auricular device 100 can be configured to obtain power from a power source external to the auricular device 100. For example, an auricular device 100 can include or can be configured to connect to a cable which can itself connect to an external power source to provide power to the auricular device 100. In some implementations, an auricular device 100 does not include power source 110.

b. Example Aspects Related to Physiological Sensors for an Auricular Device

An auricular device 100 can include various sensors for determination of physiological parameters and/or for generating signals responsive to physiological characteristics of a user. For example, as shown in FIG. 2A, an auricular device 100 can include any or all of an oximetry sensor 112 and/or one or more temperature sensors 118.

An oximetry sensor 112 (which may also be referred to as an "optical sensor") can include one or more emitters and one or more detectors for obtaining physiological information indicative of one or more blood parameters of a user. These parameters can include various blood analytes such as oxygen, carbon monoxide, methemoglobin, total hemoglobin, glucose, proteins, glucose, lipids, a percentage thereof (e.g., concentration or saturation), and the like. An oximetry sensor 112 can also be used to obtain a photoplethysmograph, a measure of plethysmograph variability, pulse rate, a measure of blood perfusion, and the like. Information such as oxygen saturation ($SpO_2$), pulse rate, a plethysmograph waveform, respiratory effort index (REI), acoustic respiration rate (RRa), EEG, ECG, pulse arrival time (PAT), perfusion index (PI), pleth variability index (PVI), methemoglobin (MetHb), carboxyhemoglobin (CoHb), total hemoglobin (tHb), glucose, can be obtained from oximetry sensor 112 and data related to such information can be transmitted by an auricular device 100 (e.g., via communication module 106) to an external device (e.g., a separate computing device, a patient monitor, and/or mobile phone). An auricular device 100 can be configured to operably position the oximetry sensor 112 (e.g., emitter(s) and/or detector(s) thereof) proximate and/or in contact with various portions of an ear of a user when the auricular device 100 is secured to the ear, including but not limited to, a pinna, a concha, an ear canal, a tragus, an antitragus, a helix, an antihelix, and/or another portion of the ear.

An auricular device 100 can include one or more temperature sensors 118. For example, an auricular device 100 can include one or more (such as one, two, three, four, five, six, seven or eight or more temperature sensors 118) that are configured to determine temperature values of the user and/or that are configured to generate and/or transmit signal(s) based on detected thermal energy of the user to processor 102 for determination of temperature value(s). An auricular device 100 can be configured to operably position the temperature sensors 118 proximate and/or in contact with various portions of an ear of a user when the auricular device 100 is secured to the ear, including but not limited to, a pinna, a concha, an ear canal, a tragus, an antitragus, a helix, an antihelix, and/or another portion of the ear. As an alternative or as an addition to such temperature sensor(s) 118 configured to determine body temperature values and/or to generate signal(s) responsive to thermal energy to processor 102 for temperature determination, an auricular device 100 can include one or more additional temperature sensors for measuring ambient temperature. For example, an auricular device 100 can include one or more temperature sensors 118 for determining temperature values of the user and one or more temperature sensors 118 for determining ambient temperature. In some implementations, an auricular device 100 (e.g., via processor 102) can determine a modified, adjusted temperature value(s) of the user based on (e.g., comparisons) of data received from both types of temperature sensors. In some implementations, an auricular device 100 includes one or more temperature sensors configured to be positioned proximate and/or in contact with portions of the user's ear when the auricular device 100 is secured thereto (which may be referred to as "skin" temperature sensors) and also one or more temperature sensors configured to be positioned away from and/or to face away from skin of the user when the device 100 is secured to the ear for determining ambient temperature (which may be referred to as "ambient" temperature sensors).

As another example, in some implementations, an auricular device 100 includes one or more of such ambient temperature sensors which are operably positioned at or near a side or surface of the auricular device 100 that faces away from the user, for example, away from skin and/or ear of the user, and/or away from any portion of the ear such as those discussed herein. As discussed below, a portion of an auricular device 100 can be configured to be positioned and/or secured within an ear canal of the user when the auricular device 100 is in use, and in such implementations, the auricular device 100 can include one or more temperature sensors on such portion.

c. Example Aspects Related to Motion Sensors for an Auricular Device

With reference to FIG. 2A, an auricular device 100 can include accelerometers 114. An accelerometer 114 can be, for example, a three-dimensional (3D) accelerometer. An auricular device 100 can include gyroscopes 116.

An auricular device 100 can include at least one inertial measurement unit (herein "IMU") for measuring motion, orientation, and/or location of a user (e.g., one or more of a combination of accelerometer 114 and/or gyroscope 116). An IMU can be configured to determine motion, orientation, position and/or location of a user. A processor 102 may be configured to received motion, orientation, position, and/or location data of a user from at least one IMU. Additionally, a processor 102 may determine motion, orientation, position, and/or location of a user based on data received from at least one IMU. For example, an auricular device 100 can include an IMU that can measure static and/or dynamic acceleration forces and/or angular velocity. By measuring static and/or dynamic acceleration forces and/or angular velocity, an IMU can be used to calculate movement and/or relative position of auricular device 100. An IMU can include one or more, and/or a combination of, for example, an AC-response accelerometer (e.g., a charge mode piezoelectric accelerometer and/or a voltage mode piezoelectric accelerometer), a DC-response accelerometer (e.g., capacitive accelerometer, piezoresistive accelerometer), a microelectromechanical system (MEMS) gyroscope, a hemispherical resonator gyroscope (HRG), vibrating structure gyroscope (VSG), a dynamically tuned gyroscope (DTG), fiber optic gyroscope (FOG), a ring laser gyroscope (RLG), and the like. An IMU can measure acceleration forces and/or angular velocity forces in one-dimension, two-dimensions, or three-dimensions. With calculated position and movement data, users 1 of auricular device 100 and/or others (e.g., care providers) may be able to map the positions or movement vectors of an auricular device 100. Any number of IMU's can be used to collect sufficient data to determine position and/or movement of an auricular device 100. An auricular device 100 can be configured to determine and/or keep track of steps and/or distance traveled by a user based on data from at least one IMU (e.g., one or more of a combination of accelerometer 114, gyroscope 116).

Incorporating at least one IMU (e.g., one or more of a combination of accelerometer 114 and/or gyroscope 116) in an auricular device 100 can provide a number of benefits. For example, an auricular device 100 can be configured such that, when motion is detected (e.g., by a processor 102) above a threshold value, the auricular device 100 stops determining and/or transmitting physiological parameters. As another example, an auricular device 100 can be configured such that, when motion is detected above and/or below a threshold value, the oximetry sensor 112 and/or temperature sensors 118 are not in operation and/or physiological parameters based on oximetry sensors 112 and/or temperature sensors 118 are not determined, for example, until motion of the user falls below such threshold value. This can advantageously reduce or prevent noise, inaccurate, and/or misrepresentative physiological data from being processed, transmitted, and/or relied upon. Additionally, an auricular device 100 can be configured such that, when motion is detected (e.g., via processor 102) above a threshold value, the auricular device 100 begins determining and/or transmitting physiological parameters.

Some implementations of auricular device 100 can interact and/or be utilized with any of the physiological sensors and/or systems of FIG. 2A to determine whether a user has fallen. For example, orientation and/or motion data can be obtained from an auricular device 100 and/or a body worn sensor to determine whether a user has fallen. As another example, an auricular device 100 and/or any of the body worn sensors can communicate with an external device.

d. Example Aspects Related to Other Sensors for an Auricular Device

With continued reference to FIG. 2A, an auricular device 100 can include other sensors 120. Other sensors 120 can include, for example, a moisture sensor, an impedance sensor, an acoustic/respiration sensor, an actimetry sensor, an EEG sensor, and/or an ECG sensor, a camera, LiDAR, and/or the like. An auricular device 100 can include a housing which encloses and/or holds any of the components described above with respect to FIG. 2A, among others. In some implementations, an auricular device 100 can be similar or identical to and/or incorporate any of the features and/or sensors described with respect to any of the devices described and/or illustrated in U.S. Pat. No. 9,497,530, filed May 13, 2016, titled "Personalization of Auditory Stimulus," which is incorporated by reference herein its entirety and forms part of the present disclosure.

e. Example Aspects Related to Audio Components for an Auricular Device

An auricular device 100 can include various software and/or hardware components to allow the auricular device 100 to improve hearing of a user and/or function as a hearing aid. For example, as shown in FIG. 2A, an auricular device 100 can include microphones 122 (such as one, two, three, four, five, or six or more microphones) and/or speakers 124 (such as one, two, three, four, five, or six or more speakers). Microphones 122 can be configured to detect ambient sound, for example, outside the user's ear. Microphones 122 can be operably positioned by an auricular device 100 in a variety of locations, for example, on surface(s) of the auricular device 100 that face away from the user (e.g., away from the user's ear, face, and/or neck) when the auricular device 100 is in use (e.g., is secured to the user's ear). In some implementations, microphones 122 can convert detected ambient sound to digital signals for analysis and/or processing.

Speakers 124 can be configured to output sound into and/or toward the user's ear. Speakers 124 can be operably positioned by an auricular device 100 in a variety of locations, for example, on a portion or portions of the auricular device 100 that face toward the user when the auricular device 100 is in use. For example, speakers 124 can be operably positioned by an auricular device 100 to direct output sound within and/or toward the ear canal of the user. In some implementations, speakers 124 can be positioned on and/or along an ear canal portion of an auricular device 100 that is positioned within the user's ear canal when the auricular device 100 is in use.

f. Example Aspects of Operating Mode(s) for an Auricular Device

In some implementations, an auricular device 100 can be configured (e.g., via processor 102) to modify one or more characteristics of ambient sound detected by the one or more microphones 122. For example, an auricular device 100 can be configured to modify one or more frequencies of ambient sound detected by the microphone(s) 122. For example, an auricular device 100 can be configured to modify one or more frequencies associated with sound detected by the microphones 122 and can communicate such modified frequencies to speakers 124 for outputting to the user. This can be significantly advantageous for many persons suffering from hearing impairments who are unable to hear certain frequencies and/or frequency ranges of sound. In some implementations, a processor 102 can include a frequency adjustment module configured to carry out a frequency modification. As discussed elsewhere herein, an auricular device 100 can be configured to communicate (for example wirelessly communicate) with external devices. In some implementations, an auricular device 100 (e.g., via processor 102) can be configured to determine and output text to such external devices based on a sound detected by the microphones 122. In some examples, an auricular device 100 (e.g., via processor 102) is configured modify one or more characteristics of ambient sound detected by microphones 122 based upon a hearing profile of a user. An auricular device 100 can be configured to store one or more hearing profiles (e.g., each hearing profile associated with a particular user) in storage device 104 of an auricular device 100. Alternatively or additionally, an auricular device 100 can be configured to receive (e.g., wirelessly receive) one or more hearing profiles from an external device. For example, one or more hardware processors of such external device can execute an application (e.g., software application, web or mobile application, etc.) that can execute commands to enable the separate computing device to transmit a hearing profile to an auricular device 100 for use by the auricular device 100 and/or to instruct the auricular device 100 to employ the hearing profile to carry out modification of one or more characteristics of detected sound for the user (e.g., frequency modification).

In some cases, an auricular device 100 is configured to amplify sound that is detected by the microphones 122 prior to outputting by speakers 124. For example, in some implementations, an auricular device 100 can include an amplifier configured to amplify (e.g., increase a strength of) sound detected by the microphones 122 and/or amplify one or more signals generated by the microphones 122 based upon detected sound. In some implementations, a processor 102 can be configured to convert sound detected by the microphones 122 into digital signals, for example, before processing and/or before transmission to speakers 124.

In some implementations, an auricular device 100 can be configured to receive audio data (e.g., electronic data representing sound) from an external device and emit audio (e.g., via speakers 124) based on the received audio data. In such configurations, an auricular device 100 can function as an audio playback device. An auricular device 100 can include various software and/or hardware components to allow the auricular device 100 to carry out such audio functions. In some cases, an auricular device 100 is configured to provide noise cancellation to block out ambient sounds when the auricular device 100 is facilitating audio playback.

An auricular device 100 can be configured to operate in various modes. For example, an auricular device 100 can be configured to operate in at least one of a music or audio playback mode, a hearing aid mode, a noise cancelling mode, and/or a mute mode. While operating in a music or audio playback mode processor 102 may facilitate emission of sound to the user's ear via speakers 124 based on received audio data from an external device. During a hearing aid mode, processor 102 can modify one or more characteristics of ambient sound detected by the microphones 122 as described above (e.g., by a beam pattern or any other method such as by an audiogram). An auricular device 100 can be further configured to operate in a noise canceling mode, wherein processor 102 is configured to determine and/or cancel ambient noise in an environment. An auricular device 100 may be configured to operate in a mute mode, wherein the microphone and/or speaker may be disabled during operation. In some cases, an auricular device 100 can be configured to operate in only one of such modes and/or be ca configured to switch between these modes. As discussed elsewhere herein, an auricular device 100 can be configured to communicate (for example wirelessly communicate) with an external device. In some implementations, an auricular device 100 can be configured for communication with an external device that is configured to execute an application (e.g., software application, web or mobile application, etc.) that can execute commands to enable the separate computing device to instruct the auricular device 100 to employ one of a plurality of modes of the auricular device 100 (e.g., the audio playback mode, hearing aid mode, noise cancelling mode, and/or mute mode).

An auricular device 100 can be configured to operate in a differential audio playback mode. Differential audio playback can be used, for example during noise cancellation, in spatial audio applications, to enhance overall audio quality, and/or to cancel common-mode signals. Differential audio payback can be implemented by an auricular device 100 and/or a case 200. In some examples, a microphone array including microphones 122 can generate audio data responsive to detecting audio and can transmit the audio data to a processor 102. Processor 102 can process audio data originating from microphones 122. Processor 102 can separate portions of audio data corresponding to audio sources. For example, processor 102 can separate a portion of an audio signal corresponding to a person talking from other portions of an audio signal corresponding to ambient noise. In some implementations, the processor 102 can separate portions of audio data to correspond to various people's voices such as by implementing voice recognition. For example, the processor 102 can separate a first portion of audio data corresponding to a first person's voice and can separate a second portion of audio data corresponding to a second person's voice. The processors 102 may implement machine learning (e.g., a neural network) to process audio data from the microphones 122 and/or to process separate portions of the audio data based on an audio source. In some implementations, the processors 102 can separate a user's own voice from an audio source. In some implementations, the processor 102 can separate portions of the audio based on whether the associated audio source is near (e.g., near-field audio source) or far (e.g., far-field audio source). The processor 102 can apply different signal processing to the various portions of audio. For example, the processor 102 can suppress, subtract, cancel, etc. a portion of audio, such as a portion of the audio corresponding to ambient noise or a portion of audio corresponding to a person talking that is not of interest to the user (e.g., a stranger). As another example, the processor 102 can amplify a portion of audio, such as a portion of audio corresponding to a far-field audio source which may be quiet or corresponding to a person talking who is of interest to the user (e.g., a relative of a user, an orator, etc.). A processor 102 can synchronize and/or align the original audio and the determined differential signal. Additionally a processor 102 can combine synchronized audio data and/or the differential audio data before transmitting audio data to one or more speakers 124. In some examples, the differential audio data and the audio data are combined to optimize an overall audio quality by either reducing an impact of external noise and/or enhancing specific audio features. In some examples, a processor 102 can recognize one or more voices from an audio source(e.g., voice recognition) and enhance audio associated with the audio source via a differential audio playback mode. In some examples, a processor 102 can identify and cancel noise based on received audio in a differential audio playback mode.

In some examples, processor 102 can determine an approximate distance between a user of an auricular device 100 and an audio source (e.g., determine whether audio source is near-field or far-field). For example, processor 102 can determine a distance from audio data originating from microphones 122 responsive to audio based on arrival time of the audio detected at the microphones 122 (e.g., a difference in arrival time at various microphones within an array), and/or a difference in volume of the audio detected at the microphones 122.

In some implementations, an auricular device 100 can be similar or identical to and/or incorporate any of the features and/or sensors described with respect to any of the devices described and/or illustrated in U.S. Pub. No. 2022/0070604, published Mar. 3, 2022, titled "Audio Equalization Metadata," which is incorporated by reference herein its entirety and forms part of the present disclosure.

g. Example Aspects Relating to a Beamforming Filter Unit for an Auricular Device An auricular device 100 can include one or more beamformer filter units 128. A beamformer filter unit 128 can be for example, software, hardware, and/or a combination thereof. A beamformer filter unit 128 can filter noise while maximizing the sensitivity of an audible signal from a target acoustic source, or spatially process a target acoustic source among a multitude of acoustic sources in a user's environment. A beamformer filter unit 128 can have an input electrically connected to an output of at least one transducer of an auricular device 100. Additionally, the beamformer filter units 128 can have an output electrically connected to an input of a processor 102 of an auricular device 100. In some implementations, the auricular device may be configured with a beamformer filter unit 128, although it will be understood that beam forming may be accomplished by one, two, or more beamformer filter units 128 and/or processor 102.

In an example implementation, a beamformer filter unit 128 may be configured to transmit a beamformed signal to a processor 102 based on at least a first input signal from a first transducer, and/or a second input signal from a second transducer. The beamformer filter units 128 may be configured to transmit a beamformed signal to a processor 102 based on a plurality of input signals from a plurality of transducers (an array of transducers). A transducer can be, for example, microphones 122. Microphones 122 can be positioned to form a microphone 122 array, wherein the beamformer filter unit 128 receives a signal from the microphone 122 array, generates a beamformed signal, and transmits the beamformed signal to a processor 102. Moreover, a processor 102 may transmit the beamformed signal to speakers 124.

A target acoustic source of a beamformed signal can originate from any direction with respect to the user, for example, towards a user's mouth, towards a communication partner in front of a user, or behind a user. Determining a directionality for a beamformed filter can be accomplished by any of several means, for example, estimating a phase difference for the signals from each of a plurality of microphones 122. In some examples, a beamformer filter unit 128 can be configured to determine directionality of a signal based on an adaptive beamforming configuration as described below. Additionally, a beamformer filter unit 128 may process an audible signal in the time domain or in the frequency domain, or partially in the time domain and/or partially in the frequency domain. It should be appreciated that one skilled in the art can identify any one of a means of determining the target acoustic source.

In an example implementation, the input transducers can be at least microphones 122. Advantageously, the input transducers can be an array of microphones 122 directionally adapted to enhance the target acoustic source among a multitude of acoustic sources in the local environment of the user wearing an auricular device 100. Additionally, and/or alternatively, the array of microphones 122 can be located at one or more of the following locations: affixed to a housing of an auricular device 100, elsewhere on the body of a user, and/or at any other predetermined location. In another implementation, a processor 102 can receive an input from the array of microphones 122 and implement functions of a beamformer filter unit 128 such that the processor 102 enhances the sensitivity of an audible signal from a target acoustic source.

In some examples, a beamformer filter unit 128 can be used by a processor 102 in conjunction with at least one or more physiological sensors of an auricular device 100 to determine and suppress and/or emphasize a target acoustic source. In an example implementation, a processor 102 obtains motion data of a user from motion sensors (e.g., accelerometers 114 and/or gyroscopes 116) of an auricular device 100 and estimates the user's orientation to determine a 3D position of sound. A beamformer filter unit 128 can be configured to emphasize audio from the determined 3D position, and suppress audio from all other positions, such that the user hears sound from the determined 3D position, and noise from other positions may be reduced. Additionally, a processor 102 may transmit motion data to a beamformer filter unit 128 such that audio from a target acoustic source and audio from ambient noise is modified accordingly. Advantageously, an auricular device 100 can change the target acoustic source with respect to the user's orientation such that, for example, a target acoustic source remains constant as the user changes orientation.

Figure 3A:
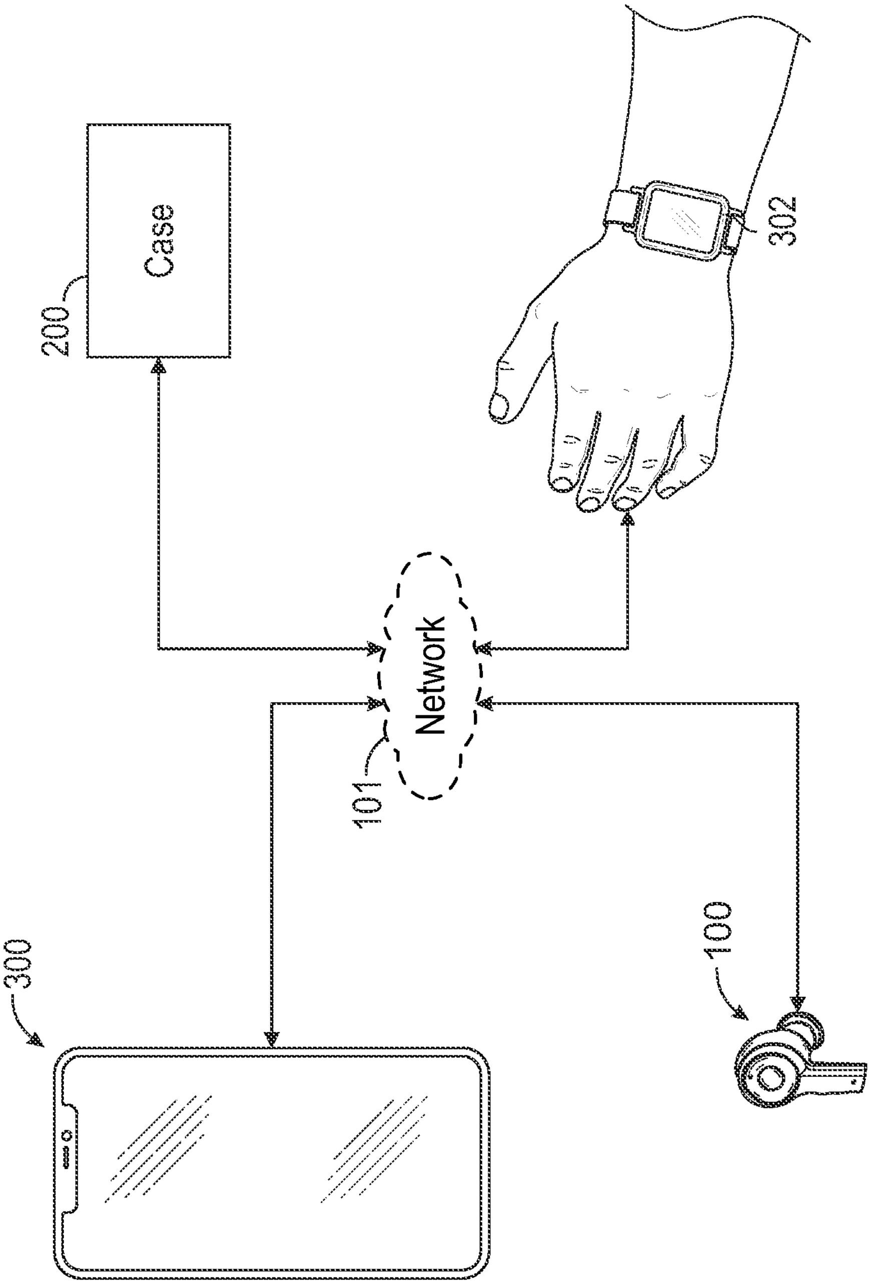
FIGS. 3A-3B illustrate an example operating environments for an auricular device, a case, and/or external devices.
Figure 3B:
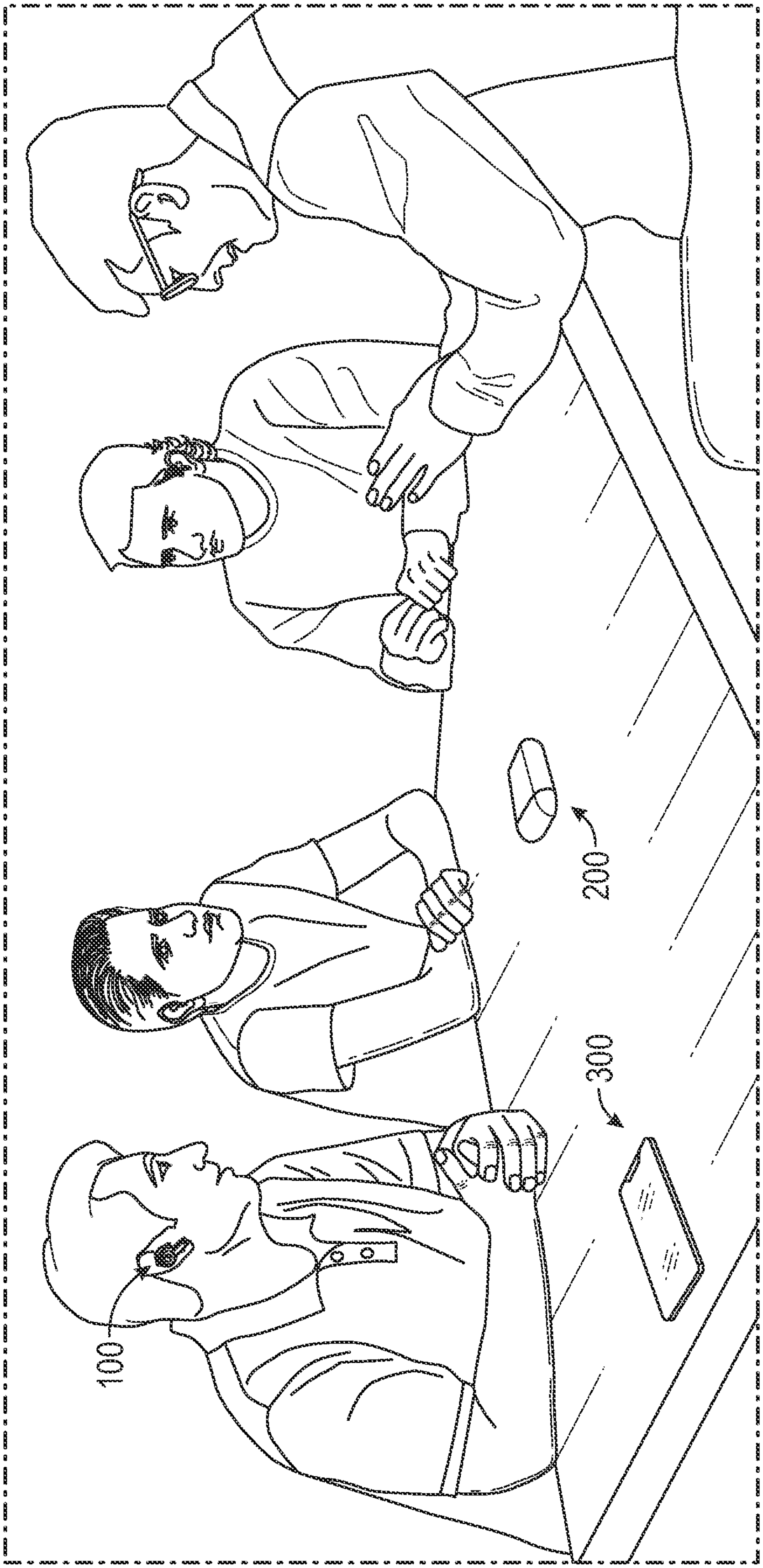

Advantageously, an auricular device 100 can be wirelessly connected to an external device 300 as described in FIGS. 3A-3B. An external device 300 may transmit an intended target acoustic source (e.g., a direction, or an audible signal) relative to a user such that a beamformer filter unit's (e.g., beamformer filter unit 128 of FIG. 2A) maximum sensitivity corresponds to a user's selection. In an additional implementation, an external device may transmit a predetermined target acoustic source relative to the user such that the beamformer filter unit 128 suppress and/or emphasizes sound from the target acoustic source. A transmitted target acoustic source may be a predefined beam pattern. For example, an omni-directional, cardioid, supercardioid, hypercardioid, bidirectional, and lobar (e.g., target canceling, pointing in a number of specific directions) relative to the user, or a dynamic beam pattern may be transmitted from an external device to the auricular device 100.

Example beam patterns are illustrated as part of FIGS. 4A-4F below. The illustrative examples include a cardioid beam pattern along with a lobar beam pattern. Further FIGS. 4A-4F depict signals that may be received by an auricular device 100 and/or modified based on a selected beam pattern and/or a user's orientation.

In an example implementation, a processor 102 can receive a predetermined beam pattern, wherein the beam pattern is a dynamic beam pattern which may cause the beamformer filter unit 128 beam to vary based on at least on one input from the one or more sensors of an auricular device 100. For example, an IMU may cause the beam pattern to vary based on the detected movement of the user wearing an auricular device 100.

In one example of a dynamic beam patter, input from the IMU may cause the beam to appear "fixed" (e.g., static) as a user rotates. Advantageously, the target acoustic source may originate from the same location while the user changes orientation. In another implementation, the beam pattern of the beamformer filter unit 128 may be reduced depending on the user's orientation. For example, the beam pattern may be reduced if the IMU detect that the user leans forward.

In an additional implementation, the storage device 104 may receive from a processor 102 or an external device, a predefined beam pattern. The one or more predefined beam patterns may be retrieved and implemented by the beamformer filter unit 128. Additionally, the beamformer filter unit 128 may transmit to the storage device 104, the current beam pattern. A beamformer filter unit 128 may receive a request from at least a processor 102 or an external device, to transmit the current beam pattern to the storage device 104.

h. Example Aspects Related to An Illuminating Indicator for an Auricular Device With continued reference to FIG. 2A, the auricular device can be configured to include at least one indicator 126. An auricular device 100 can include more than one indicator 126 affixed to the external housing of an auricular device 100. An indicator 126 can be configured to provide a user and/or others with a visual representation of a status of an auricular device 100. Additionally, the indicator 126 can provide a user and/or others with a visual representation of an individual component of the auricular device, such as accelerometer 114, gyroscope 116, oximetry sensor 112, other sensors 120, temperature sensor 118, processor 102, power source 110, microphones 122, storage device 104, communication module 106, information element 108, speakers 124, indicator 126, or beamformer filter unit 128. An indicator 126 can be, for example, a light emitting diode (LED) capable of emitting a plurality of colors at one or more frequencies as determined by a processor 102.

An indicator 126 can provide, for example, users with vital information regarding at least a status of an auricular device 100 and/or the present condition of the user based on the one or more physiological parameters determined by the auricular device 100. For example, the auricular device can include a processor 102 configured to determine the status of an auricular device 100 and/or a condition of a user and provide a visual representation of the status of the auricular device 100 other users, by changing at least one of the output characteristics of the indicator 126.

In an example implementation, a processor 102 may determine a state of an auricular device 100 including: whether the power source 110 of the auricular device 100 decreased below a threshold value, whether one or more of the sensors (e.g., the oximetry sensor 112, temperature sensor 118, or other sensors 120) has failed, whether a physiological parameter of the user has met or exceeded a threshold, or any other sensor disclosed herein, whether the user may be sourcing hearing data from an external device or an ambient source, and/or whether to communicate information with an external device (such as a healthcare monitoring device and/or smartphone). Additionally, a processor 102 may associate one or more of the following illumination characteristics of indicator 126 with at least one status: changing the indicator 126 from one of a plurality of colors to a different color, changing the strobe (or frequency) of indicator 126, changing the pulse duration (e.g., a duty cycle) of indicator 126, and/or changing the intensity of the indicator 126. A processor 102 can combine one or more of the illumination characteristics to represent one or more statues, for example, an indicator 126 having distinct color, a determined pulse, a duty cycle, and/or intensity. A pulsed output can be caused by a processor 102, resulting in the indicator 126 illuminating based on a determined frequency, such as 0.1 Hz, 0.5 Hz, 1 Hz, 2 Hz or any other frequency. A duty cycle can be used in combination with a pulsed output, for example, the duty cycle of the indicator can be at or about 25% for a 1 Hz signal, thereby the indicator 126 may be illuminated for approximately 0.25 seconds between periods of approximately 0.75 seconds where the indicator 126 may not be illuminated. A processor 102 may cause indicator 126 to illuminate at a given intensity. In an example implementation, a processor 102 may cause the indicator 126 to illuminate at approximately half the intensity rating of the indicator 126. In another example implementation, a processor 102 may cause the indicator 126 to illuminate at the full intensity rating of the indicator 126. The intensity rating of an indicator 126 can be determined based on, for example, the indicator 126 maximum lumens (e.g., a candela) output. Additionally, and/or alternatively, the intensity of the indicator 126 can be based on a measured electrical characteristic (e.g., a voltage and/or a current) supplied to the indicator 126 to cause the indicator to illuminate.

In an example implementation, a processor 102 can be configured to cause the indicator 126 to emit a first colored output (e.g., green) when the processor 102 determines an auricular device 100 does not have a fault condition (e.g., normal operation). A processor 102 can be further configured to cause an indicator 126 to emit a second colored output (e.g., red) when the processor 102 determines that an auricular device 100 has a fault condition (e.g., low power source voltage, one or more sensors malfunctions has occurred). In another example implementation, an auricular device 100 can have more than one indicator 126 (e.g., two, three, four, five, and/or more). A processor 102 may associate a status with at least one indicator 126 output. Alternatively, a processor 102 may cause an indicator 126 to change output characteristics based on a determined status of an auricular device 100. Additionally, and/or alternatively, a processor 102 can cause an indicator 126 to emit a coordinated output such that, for example a fault condition can be expressed by more than one indicator 126.

Additionally, a processor 102 may be configured to cause an indicator 126 to emit light based on one or more operating modes of an auricular device 100. An emitted light for one or more operating modes can include at least one and/or a combination of illumination characteristics (e.g., a distinct color, pulse, duty cycle, and/or intensity). an operating mode of an auricular device 100 can be any of the operating modes described herein (e.g., music or audio playback mode and/or hearing aid mode) and/or any additional operating modes as configured by, for example, a processor 102 of the auricular device 100. A processor 102 may be configured to cause an indicator 126 to emit light based on a change from one or more first operating modes to one or more second operating modes.

Advantageously, an auricular device 100 having with an indicator 126, wherein the auricular device 100 can be configured to emit light based on one or more operating modes, can notify those in the presence of the user of the current operating mode of the auricular device 100. Someone in view of an indicator 126 may correlate one or more illumination characteristics with one or more operating modes of the auricular device, thereby a person in the presence of the user may be able to determine the operating mode of the auricular device 100 without having to interrupt the user. For example, those in the presence of the user may see the indicator 126 and determine that the user may be operating an auricular device 100 in a hearing aid mode, thereby the user can hear a person speaking in an ambient environment. Having an auricular device 100 configured with an indicator to emit light based on one or more operating modes can be used to notify those in the presence of the user that the user may be sourcing audio data from an alternative source (music or audio playback mode), such as for example, listening to music sourced from the storage device 104 and/or sourced from an external device. Hence, those in the presence of the user may see the indicator 126 and determine that the user may not be able to hear speech in an ambient environment.

In an example implementation, a processor 102 may be configured to cause the indicator 126 to emit light while the auricular device is operated in a hearing aid mode such that persons near the user can see the emitted light. The emitted light can have one or more of the illumination characteristics as discussed herein. In one implementation, the illumination characteristics for operating in an audio playback mode can be, for example, a green light a about a 1 Hz pulse, having approximately a 50% duty cycle. As discussed herein, a processor 102, operating in a hearing aid mode may cause speakers 124 to emit sound based on received audio data from microphone 122 such that a user hears speech and audio from the user's ambient environment (e.g., from a presenter during a meeting, or from someone having a conversation with the user).

In another example implementation, a processor 102 may be configured to cause the indicator 126 to emit light while the auricular device is operated in a music or audio playback mode such that persons near the user can see the emitted light. The emitted light can have one or more of the illumination characteristics disclosed herein. In one implementation, the illumination characteristics for operating in an audio playback mode can be, for example, a blue light, at about a 2 Hz pulse, at or about a 75% duty cycle. A processor 102, operating in the music or audio playback mode may cause the speakers 124 to emit sound based on audio data sourced from, for example, storage device 104 and/or sourced from an external device. In some examples, a processor 102 can cause an indicator 126 to emit one or more illumination characteristics when the user of an auricular device 100 does not wish to be disturbed.

A processor 102 can be configured to cause indicator 126 to illuminate according to one or more illumination characteristics (e.g., a distinct color, frequency, duty cycle, and/or intensity as disclosed above), to indicate that an auricular device 100 is wirelessly connected a communication channel. For example, indicator 126 can be illuminated when an auricular device 100 is connected to a common audio source (e.g., multiple auricular devices are all receiving audio from a common communication channel, and thus all users hear the same sound). In some examples, a processor 102 can cause indicator 126 to illuminate according to one or more illumination characteristics disclosed above, when an auricular device 100 is not connected to a common source (e.g., such that an auricular device 100 can visually indicate that the user is not connected to a common communication channel). In one implementation, a processor 102 can cause indicator 126 to emit a green light when an auricular device 100 is connected to a common audio channel, and/or cause indicator 126 to emit a red light when the auricular device is not connected to a common audio channel. In some examples, a user can quickly identify one or more additional users that are connected to a common audio channel and thus, determine which users are receiving the same audio input from auricular device 100. A processor 102 may be configured to cause a plurality of indicators 126 to emit one or more colors and/or one or more illumination characteristics, after determining whether an auricular device 100 is connected to a common communication channel. In some examples, a processor 102 can cause indicator 126 to illuminate according a first illumination characteristic when an auricular device 100 is connected to a first communication channel, and cause indicator 126 to illuminate according to a second illumination characteristic when the auricular device 100 is connected to a second communication channel (e.g., to visually indicate which communication channel an auricular device 100 is connected to).

In an additional example implementation, the auricular device can be configured with more than one indicator 126, wherein a processor 102 is further configured to activate the more than one indicator 126 with, for example, a high intensity pulsing red output if the processor 102 determines that the patient may be suffering from a health condition (e.g., the blood oxygen saturation level of the patient may be below a threshold value as measured by the oximetry sensor 112, the body temperature of the patient may be below a threshold value as measured by the temperature sensor 118, or that the patient may be suffering from a fall as determined by a received audible signal from the microphones 122 and or the IMU).

III. Example Aspects Relating to a Protective Case for An Auricular Device

Figure 2B:
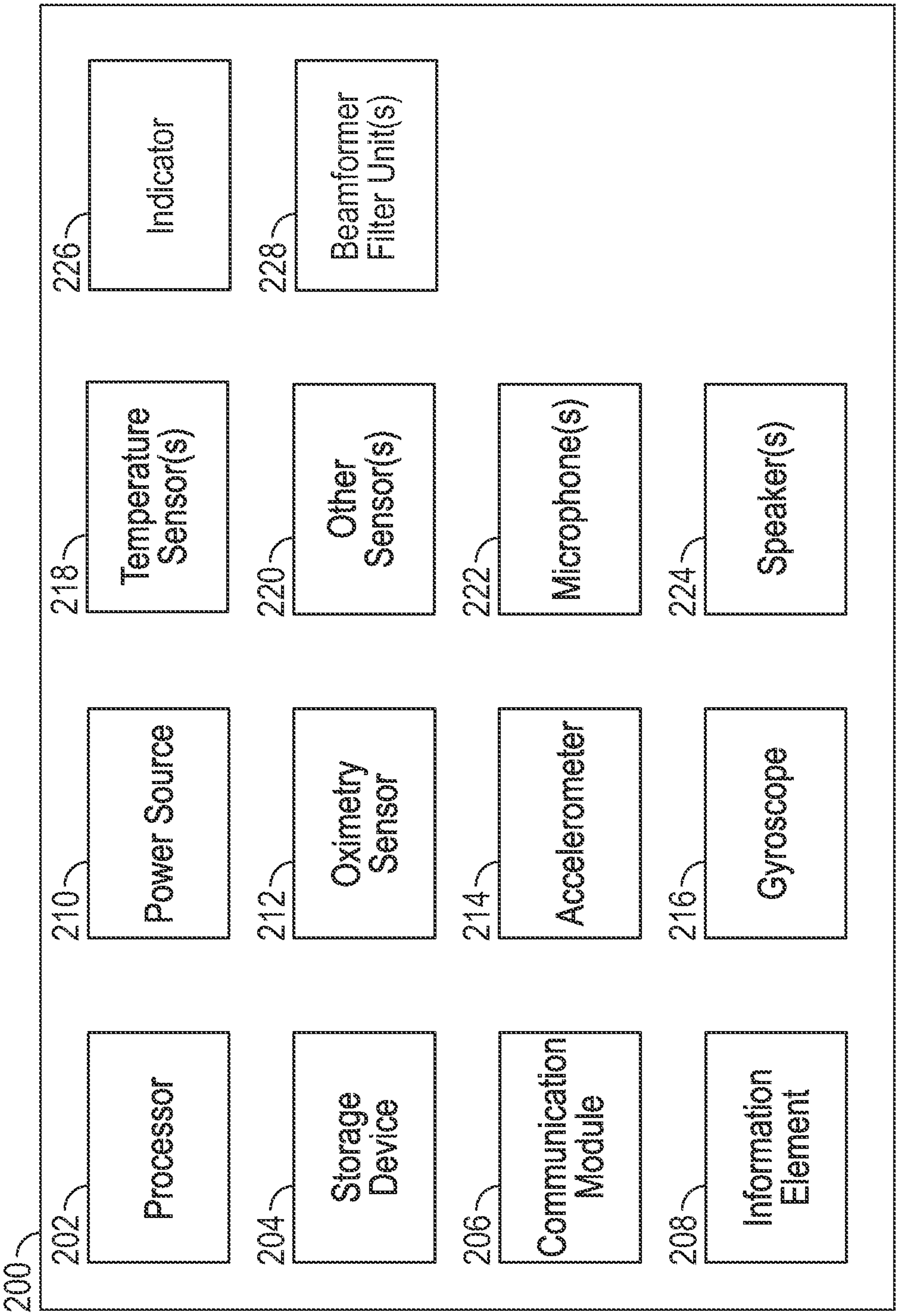
FIG. 2B illustrates an example block diagram of certain features of an external device.

FIG. 2B illustrates an example block diagram for a case 200 configured to carry an auricular device 100. A case 200 can serve as a protective enclosure for an auricular device 100, protecting from external elements such as dust, dirt, and scratches and/or preventing unnecessary wear. A case 200 can include a processor 202, a storage device 204, a communication module 206, an information element 208, a power source 210, oximetry sensors 212, accelerometer(s) 214, gyroscope(s) 216, temperature sensor(s) 218, other sensor(s) 220, microphone(s) 222, speaker(s) 224, indicator(s) 226, and/or a beamformer filter unit 228. In some examples, the functionality of one or more components of case 200 can be the same and/or similar to that as described above with reference to an auricular device 100. As an example implementation and not meant to be limiting, a case 200 can include temperature sensor(s) 218, a processor 202, a storage device 204, microphone(s) 222, speaker(s) 224, a beamformer filter unit 228, and/or a communication module 206.

As another example implementation, a case 200 can be configured with, among other components, processor 202, communication module 206, microphone(s) 222, and/or a beamformer filter unit 228, to receive audio, determine a directionality of the audio, apply spatial processing, and/or transmit the audio to an auricular device 100. In some examples, case 200 can be configured to perform one or more tasks associated with a triangulated beamformer as described below. As another example, case 200 can be configured to emit audio via one or more speaker(s) 224 in response to a received audio data from, for example, an auricular device 100 and/or an external device. In a further example, case 200 can automatically pair with an auricular device 100 once the auricular device is separated from the case 200.

In addition to the example functionality as described above, case 200 can, via power source 210, provide an auricular device 100 with a charging capability. In some examples, case 200 can be a portable charger for an auricular device 100. For example, a case 200 may automatically charge an auricular device 100 after the auricular device 100 is placed inside and/or near the case 200. In some example implementations, case 200 may and/or may not be configured to carry auricular device 100. In some examples, case 200 can be another device such as a podium, a desktop microphone, and/or another type of external device not generally worn by a user. Additional implementations and/or configurations of an auricular device 100, a case 200 and/or external devices are described below with reference to FIGS. 5A, 5B, and 6.

IV. Example Aspects of an Operating Environment Including an Auricular Device FIGS. 3A-3B illustrate an interaction between an auricular device 100 and various other devices and/or systems. With reference to FIGS. 3A-3B, an auricular device 100 can communicate, for example, wirelessly via network 101, with an external device 300 and/or a watch 302 among other types of devices (e.g., tablet, PDA, among others), and/or a case 200. Communication between a case 200, external device 300, watch 302 and auricular device 100 can be a wireless communication via network 101 utilizing any of the wireless communication protocols discussed herein, among others. An auricular device 100 can be configured to transmit to a case 200, external device 300 and/or watch 302, data associated with physiological parameters of the user (such as any of those discussed herein), motion data, and/or location data, among other types of data. An auricular device 100 can be configured to receive various instructions and/or information from a case 200, external device 300 and/or watch 302. For example an auricular device 100 can receive instructions or information associated with employing an audio playback mode or hearing aid mode and/or in utilizing a particular hearing aid profile as described above. In some examples, a watch 302 can be configured to determine one or more physiological parameters of a user (e.g., oxygen saturation, pulse rate, heart rate, among others) and/or other information of a user (e.g., location and/or movement data determined from accelerometer(s), gyroscope(s), magnetometer(s) of the watch 302) and transmit information associated with the one or more physiological parameters to an auricular device 100 any other device described herein.

Although the present disclosure may describe implementations and/or use of an auricular device 100 within the context of an ear of the user, it is to be understood that two of such auricular devices 100 can be secured to two ears of the user (one per each ear) and can each be utilized to carry out any of the functions and/or operations described herein with respect to auricular device 100. By way of non-limiting example, while FIGS. 3A-3B illustrate a single auricular device 100, it is to be understood that two of such auricular devices 100 may be employed to carry out any of the functions and/or operations described herein with respect to auricular device 100 and/or to interact with any of the devices and/or systems described herein.

Any auricular device 100 described herein and/or components and/or features of the auricular devices described herein can be integrated into a wearable device that secures to another portion of a user's body. For example, any of the components and/or features of the auricular devices described herein can be integrated into a wearable device that can be secured to a head, chest, neck, leg, ankle, wrist, or another portion of the body. As another example, any of the components and/or features of the auricular devices described herein can be integrated into glasses and/or sunglasses that a user can wear. As another example, any of the components and/or features of the auricular devices described herein can be integrated into a device (e.g., a band) that that a user can wear around their neck.

In some implementations, an auricular device 100 can be utilized to monitor characteristic(s) and/or quality of sleep of a user. As discussed elsewhere herein, an auricular device 100 can be configured to communicate (for example wirelessly communicate) with external devices (e.g., such as a case 200, external device 300 and/or watch 302 of FIGS. 3A-3B). In some implementations, an auricular device 100 may be configured for communication with an external device that is configured to execute an application (e.g., software application, web or mobile application, etc.) that can execute commands to enable the separate computing device to determine one or more characteristics and/or quality of sleep of a user based on one or more physiological parameters determined by the auricular device 100 and transmitted to the separate computing device. For example, as discussed elsewhere herein, an auricular device 100 can be configured to determine oxygen saturation, pulse rate, and/or respiration rate of a user and transmit such physiological parameters to the separate computing device for determination of characteristics and/or quality of the user's sleep.

A network 101 can include any one or more communications networks, such as the Internet. A network 101 may be any combination of local area network and/or a wireless area network or the like. Accordingly, various components of the computing environment of FIGS. 3A-3B, can communicate with one another directly or indirectly via any appropriate communications links and/or networks, such as network 101 (e.g., one or more communications links, one or more computer networks, one or more wired or wireless connections, the Internet, any combination of the foregoing, and/or the like). Similarly, the various components (e.g., auricular device 100, case 200, external device 300 and/or watch 302) and the computing environment may in various implementations, communicate with one another directly or indirectly via any appropriate communications links (e.g., one or more communications links, one or more computer networks, one or more wired or wireless connections, the Internet, any combination of the foregoing, and/or the like).

In some implementations, an auricular device 100 can be similar or identical to and/or incorporate any of the features and/or sensors described with respect to any of the devices described and/or illustrated in U.S. Pub. No. 2021/0383011, published Dec. 9, 2021, titled "Headphones with Timing Capability and Enhanced Security," which is incorporated by reference herein its entirety and forms part of the present disclosure.

V. Example Aspects Related to Beam Patterns for an Auricular Device

FIGS. 4A-4H illustrate example implementations of beam patterns, along with example signal responses for a user wearing an auricular device 100 configured with a beamformer filter unit 128 as described with reference to FIG. 2A. Audio A, B, and C depicted in FIGS. 4B, 4D, 4F, and 4H are illustrative examples, used to show differences in audio received by, for example, one or more microphones 122. One can assume, for illustrative purposes, that the origin of each audio A, B, and/or C may be of an approximate equal distance from the user, of an approximate equal frequency and amplitude, and/or of an approximate phase shifted relative to each other. Audio A, B, and/or C can be, for example, speech from another person, ambient sound, sound emitted from a speaker, and/or any other acoustic source. Audio A, B, and/or C remain at approximately 270°, 0°, and 90° respectively. Specific headings, audio, beam patterns, and associated signal responses described herein with reference to FIGS. 4A-4H are intended to be illustrative of one or more example implementations of the use of a beam pattern by an auricular device 100 and are not intended to be limiting. Thus any number of beam patterns and/or signal processing techniques may be employed by auricular device 100 depending on a desired use.

Figure 4A:
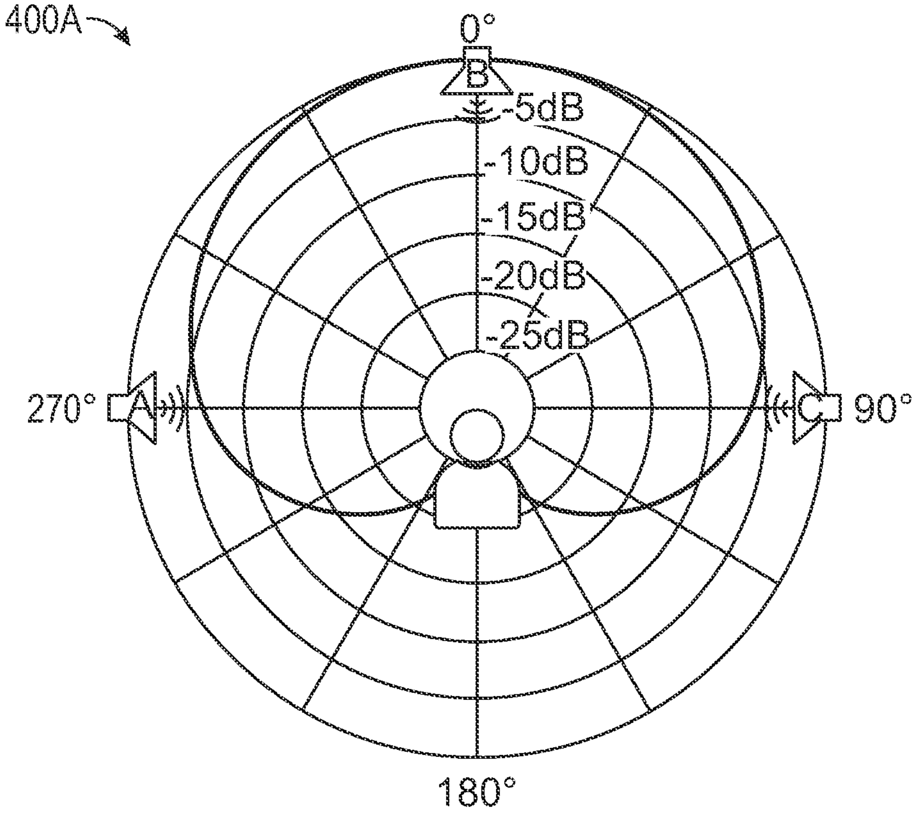
FIGS. 4A-4H illustrate example implementations of beam patterns and example signal responses of an auricular device.

FIG. 4A illustrates an example cardioid beam pattern 400A of a beamformer filter unit 128 as described with reference to FIG. 2A. An example cardioid beam pattern 400A includes increased sensitivity for sound coming from directly in front of the user wearing an auricular device 100. Additionally, the example cardioid beam pattern has reduced sensitivity for sounds coming from the right and left sides of user wearing an auricular device 100, with little to no sensitivity for sounds coming from behind the user. In FIG. 4A, a user wearing an auricular device 100 is facing approximately 0° (e.g., approximately north).

Figure 4B:
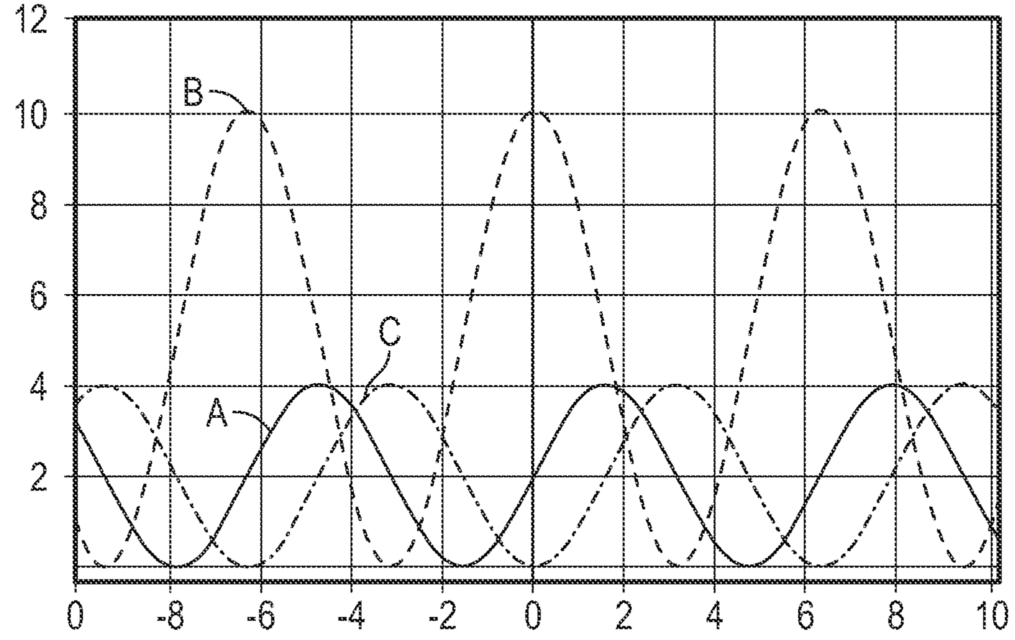

FIG. 4B illustrates an example signal response 400B of a beamformer filter unit 128 of FIG. 2A. Audio A, B and C represented in FIG. 4B can originate from audio A, B, and C of FIG. 4A. In accordance with the cardioid beam pattern, an auricular device 100 has the highest sensitivity for sound sourced form in front of the user, represented by the audio amplitude "B" of signal response 400B. Whereas an auricular device 100 has a reduced sensitivity represented by signal amplitude "A" and "C" while facing north.

Figure 4C:
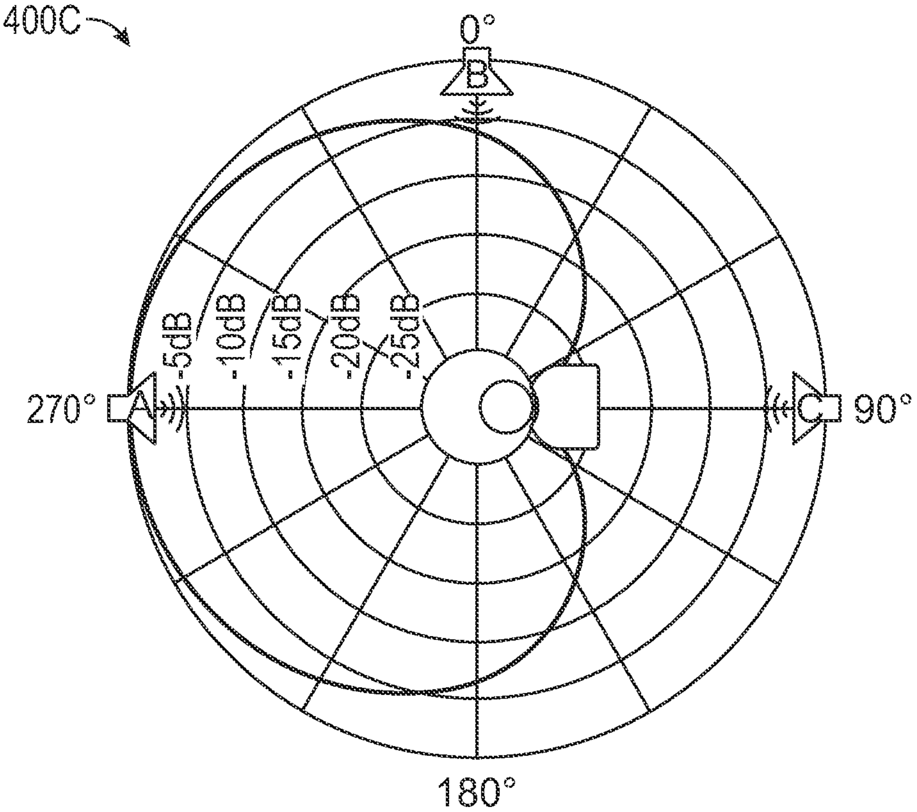

FIG. 4C illustrates an example cardioid beam pattern 400C of a beamformer filter unit 128 of FIG. 2A. An example cardioid beam pattern 400C includes increased sensitivity for sound coming from approximately 270° (e.g., approximately west) as a user wearing an auricular device 100 is facing approximately 270°. Additionally, and as described with reference to FIG. 4A, an example cardioid beam pattern can have reduced sensitivity for audio coming from the right and left sides of user while wearing an auricular device 100, with little to no sensitivity for sounds coming from behind the user.

Figure 4D:
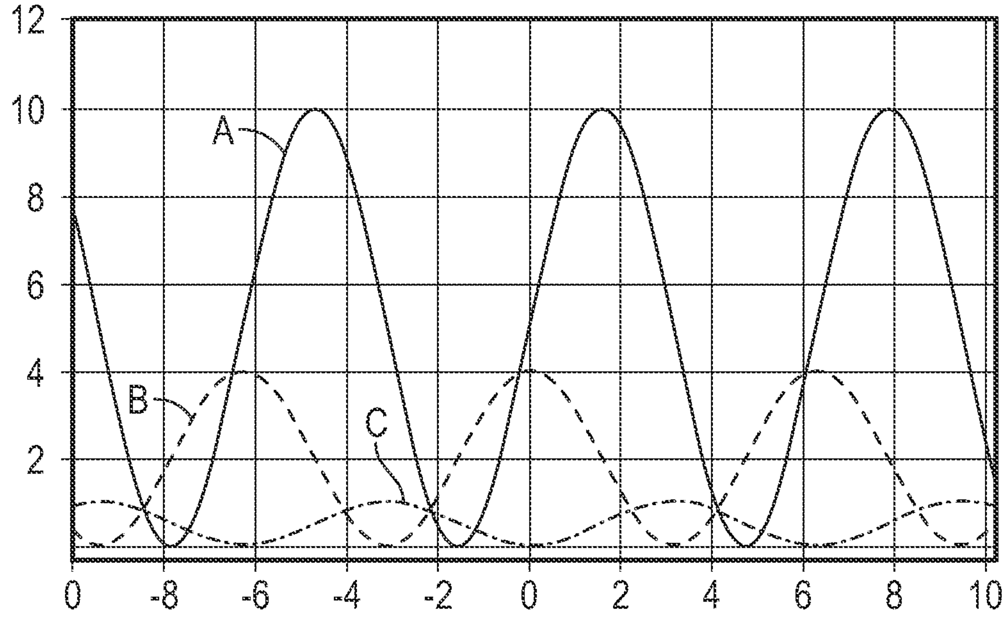

FIG. 4D illustrates an example signal response 400D of a beamformer filter unit 128 of FIG. 2A. Audio A, B and C represented in FIG. 4D can originate from audio A, B, and C of FIG. 4C. In accordance with the cardioid beam pattern, an auricular device 100 has the highest sensitivity for sound sourced form in front of the user, represented by the audio amplitude "A" in the signal response 400D. Whereas an auricular device 100 has a reduced sensitivity represented by audio coming from the side of the user, represented by signal amplitude "B", and little to no sensitivity represented by signal amplitude "C".

Figure 4E:
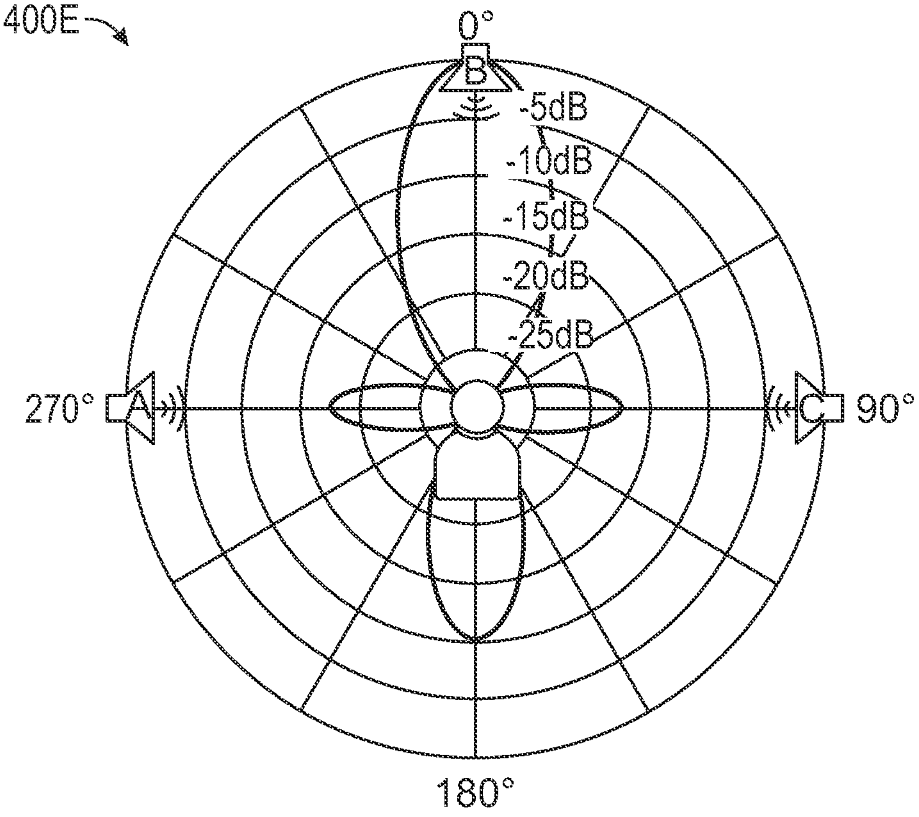

FIG. 4E illustrates an example lobar beam pattern 400E of a beamformer filter unit 128 of FIG. 2A. An example lobar beam pattern 400E includes increased sensitivity for sound coming from a narrow beam, directly in front of a user while wearing an auricular device 100. As illustrated in FIG. 4E, a user wearing an auricular device 100 is facing approximately 0° (e.g., approximately north). Additionally, the example lobar beam pattern 400E can have a limited sensitivity for sounds coming from the sides of a user and/or from behind the user.

Figure 4F:
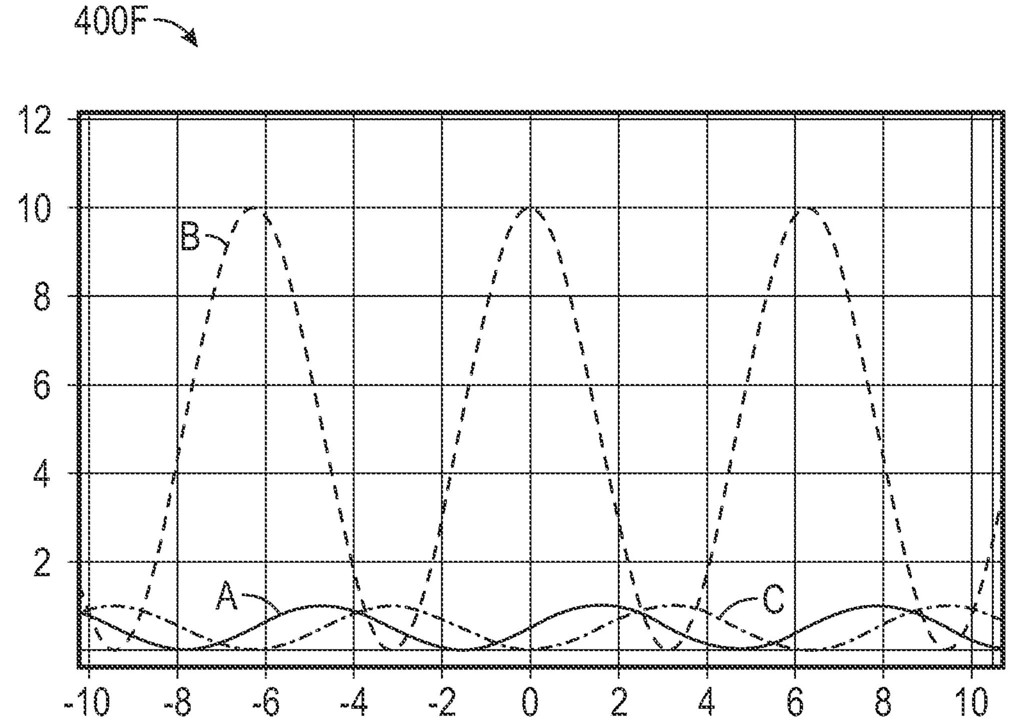

FIG. 4F illustrates an example signal response 400F of a beamformer filter unit 128 of FIG. 2A. Audio A, B and C represented in FIG. 4F correspond to audio A, B, and C of FIG. 4E. In accordance with the lobar beam pattern 400E, an auricular device 100 has the highest sensitivity for sound sourced form a narrow beam in front of a user, represented by the audio amplitude "B" of signal response 400F. Whereas an auricular device 100 has very little sensitivity represented by signal amplitude "A" and "C" while facing approximately 0° (e.g., approximately north).

Figure 4G:
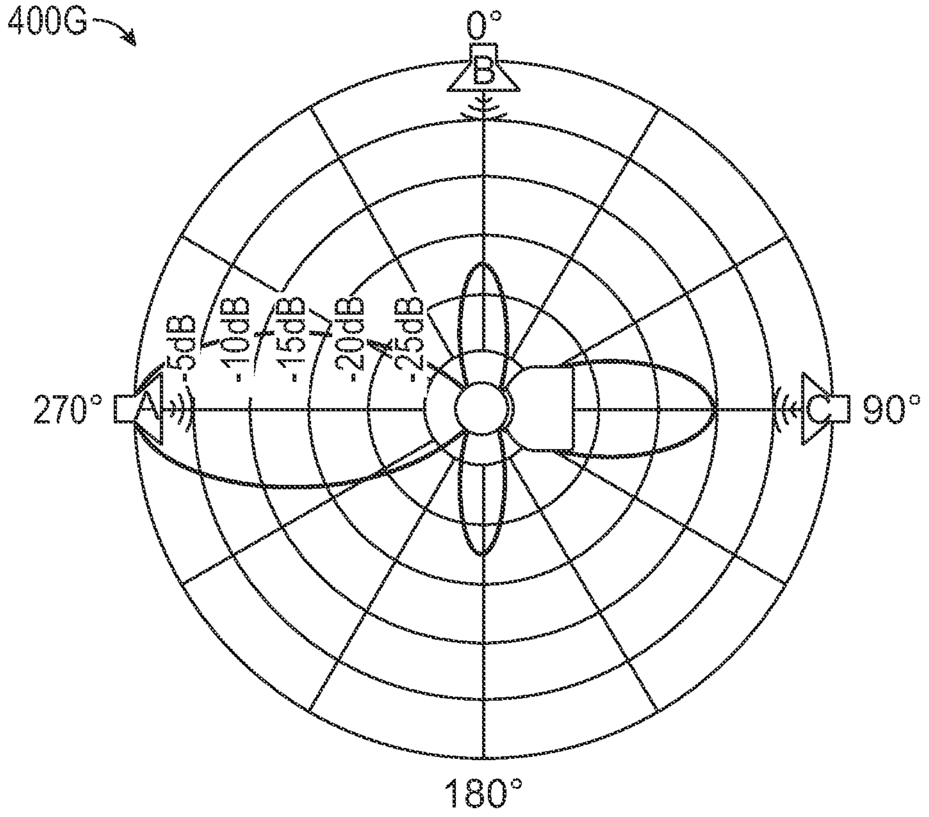

FIG. 4G illustrates an example lobar beam pattern 400G of a beamformer filter unit 128 of FIG. 2A. An example lobar beam pattern 400G includes increased sensitivity for sound coming from a narrow beam, directly in front of a user while wearing an auricular device 100. As illustrated in FIG. 4G, a user wearing an auricular device 100 is facing approximately 270° (e.g., approximately west). Additionally, the example lobar beam pattern 400G can have a limited sensitivity for sounds coming from the sides of a user and/or from behind the user.

Figure 4H:
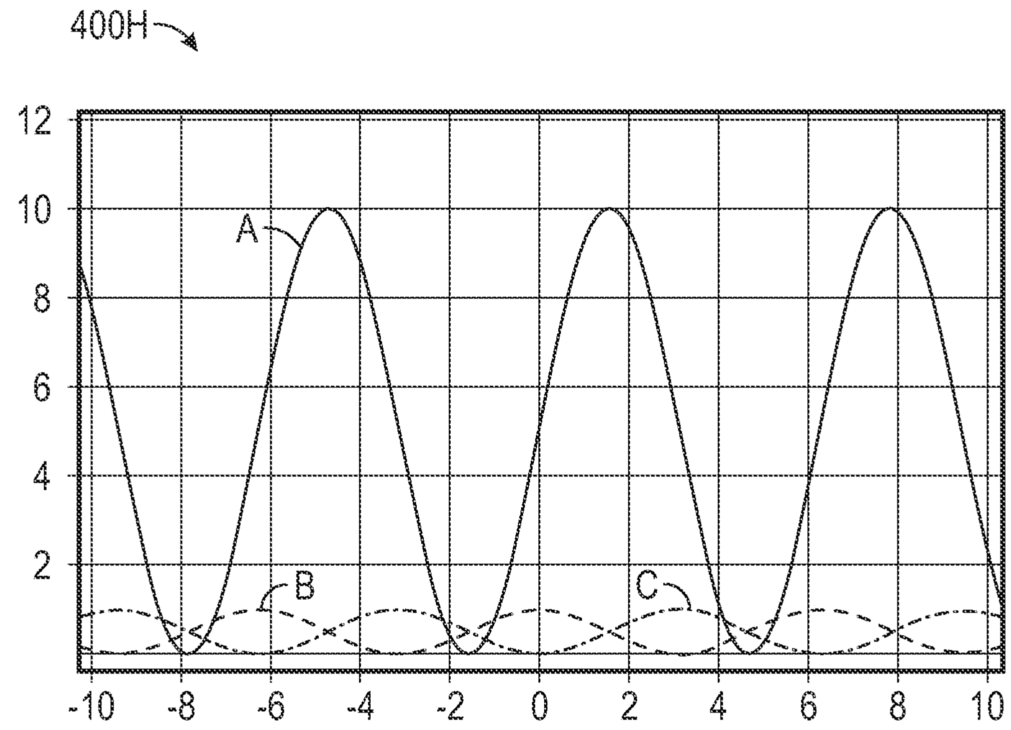

FIG. 4H illustrates an example signal response 400H of a beamformer filter unit 128 of FIG. 2A. Audio A, B and C represented in FIG. 4H correspond to audio A, B, and C of FIG. 4G. In accordance with the lobar beam pattern 400G, an auricular device 100 has the highest sensitivity for sound sourced form a narrow beam, directly in front of the user, represented by the audio amplitude "A" in the signal response 400H. Whereas an auricular device 100 has a very little sensitivity represented by signal amplitude "B" and "C".

In some implementations, a case 200 configured with a beamformer filter unit 228 as described herein can perform, execute, and/or be configured as described above with reference to an auricular device 100. For example, a case 200 can be configured with a beamformer filter unit 228 as described above can have one or more beam patterns and/or receive and modify audio data according to a beam pattern, as described herein. In some examples, the processor 102 can determine a beam pattern based on a detected sound (e.g., an indicator). In some examples, a processor 102 can, in response to a detected sound, apply one or more beam patters as disclosed herein.

VI. Example Aspects Related to a Triangulated a Beamformer

Figure 5A:
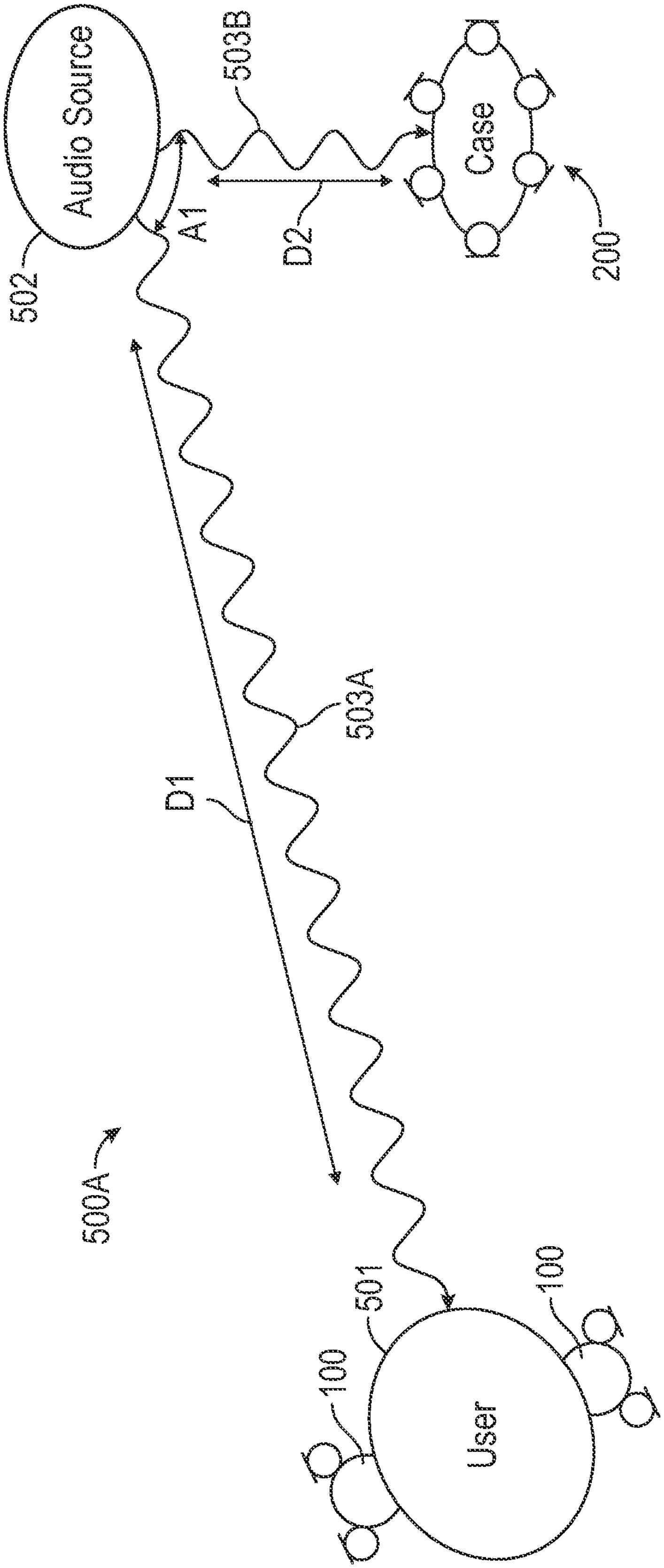
FIGS. 5A-5B illustrate an example implementation of an auricular device and a case configured for triangulated beamforming.
Figure 5B:
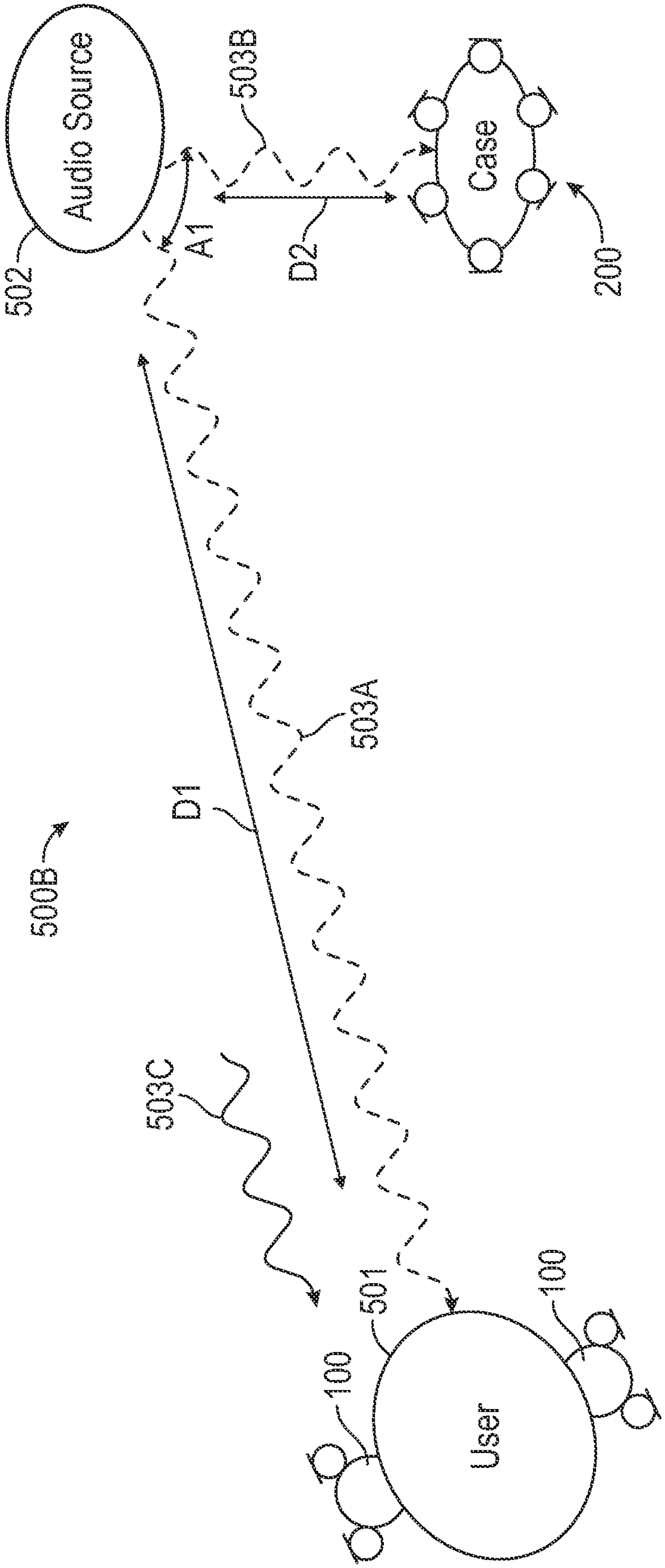

FIGS. 5A-B illustrate example implementations of an auricular device 100 and/or a case 200 configured for adaptive beamforming. Adaptive beamforming is a signal processing technique used, for example, to extract a specific audio and/or set of audio signals of interest while minimizing interference from other directions, especially when multiple audio sources are present. In some implementations, the acoustic environment 500A and/or 500B of FIGS. 5A-5B can be representative of the same and/or similar operating environments as depicted in FIGS. 3A-3B.

As illustrated in FIGS. 5A, an acoustic environment 500A can include a user 501 wearing an auricular device 100, an audio source 502, and/or a case 200. An audio source 502 can emit audio 503A and/or 503B. In some examples, audio 503A and/or 503B can be the same and/or similar audio originating from audio source 502. An auricular device 100 can be an approximate distance D1 form the audio source 502, and/or case 200 can be an approximate distance D2 form an audio source 502. When, as illustrated in FIGS. 5A and 5B, distance D2 is less than distance D1, (e.g., case 200 is closer to the audio source 502 than an auricular device 100), the case 200 can have a higher signal-to-noise ratio then the auricular device 100. Advantageously, an auricular device 100 can apply adaptive beamforming while in communication with a case 200, to leverage a high SNR, a narrower directional accuracy, and/or an increased range accuracy of the case 200, and to provide enhanced audio to a user. In some implementations, an auricular device 100 can determine one or more aspects of an acoustic environment 500A, including distance D1 and D2, orientation information for an auricular device 100, orientation information for a case 200, and/or an angle A1 between an auricular device 100 and/or a case 200.

For example, case 200 can be configured with a microphone array, wherein the microphone array is used to determine a distance D2 from an audio source 502. In some examples, case 200 can determine a distance D2 based on, for example, the amplitude of audio 503B received by a microphone array. In some examples, a case 200 can determine distance D2 (e.g., via processor 202) based on a comparison between an amplitude of audio 503B received at a first microphone and a second microphone in a microphone array. Distance D2 can be, for example any distance (e.g., 1, 5, 10, 20 or more meters).

Additionally and/or advantageously, case 200 can be configured with an array of microphones can determine orientation information relative to audio 503B, based on an adaptive beamformer applied to audio 503B. Orientation information can include 2D orientation information (e.g., a heading such as approximately 0 degrees North) and/or 3D orientation information (e.g., rotational and/or translational degrees of freedom). In some implementations, a case 200 can receive orientation information from an auricular device 100, an external device, and/or from gyroscopes 216 and/or accelerometer(s) 214 as described herein (e.g., by using an IMU and/or the like).

An auricular device 100 can be configured with a microphone array, wherein the microphone array is used to determine a distance D1 from an audio source 502. In some examples, an auricular device 100 can determine a distance D1 based on, for example, the amplitude of audio 503A received by a microphone array. In some examples, an auricular device can determine distance D1 (e.g., via processor 102) based on a comparison between an amplitude of audio 503A received at a first microphone and a second microphone in a microphone array. Distance D1 can be, for example any distance (e.g., 1, 5, 10, 20 or more meters).

Additionally and/or advantageously, an auricular device 100 (e.g., via processor 102) can determine orientation information of the auricular device 100 relative to the audio 503A (e.g., orientation information of the user 501 relative to the audio 503A). Orientation information can include 2D orientation information (e.g., a heading such as approximately 0 degrees North) and/or 3D orientation information (e.g., rotational and/or translational degrees of freedom). In some examples, an auricular device 100 configured with an array of microphones can determine orientation information based on an adaptive beamformer applied to audio 503A. In other implementations, an auricular device 100 can receive orientation information from a case 200, an external device, and/or from gyroscopes 116 and/or accelerometer(s) 114 as described herein (e.g., by using an IMU).

An auricular device 100 and/or case 200 can further determine an approximate angle A1 between the auricular device 100 and a case 200 from the position of the audio source 502. In some examples, an auricular device 100 can determine an angle A1 based on: audio 503A, a determined distance D1, orientation information of an auricular device 100, received audio 503B from a case 200, a distance D2, and/or orientation information of a case 200. In some examples, an angle A1 can be, for example, 1, 5, 10, 15, 25 and/or more degrees.

In some examples, the angle A1, distance D1 and D2, and/or orientation information can be used to spatially process audio 503A and or 503B. For example, audio 503B, received by a case 200 can be transmitted, along with one or more characteristics of an acoustic environment 500A, to an auricular device 100. The auricular device 100 can process the audio 503B and/or audio 503A (e.g., spatially process audio 503A and/or 503B based on D1, D2, A1, and/or orientation information). The auricular device 100 can modify audio 503A and/or 503B and provide a modified audio 503C of FIG. 5B to a user 501 via, for example, speakers 124 of an auricular device 100. In some implementations, audio 503C can include the enhanced sound qualities associated with the SNR of audio 503B received by a case 200, while providing a perceived directionality and/or orientation associated with audio 503A. Thus, the user 501 can perceive audio 503C as if the sound were coming from the same and/or a similar direction as audio 503A but including the increased SNR of audio 503B.

Additionally and/or optionally, acoustic characteristics (e.g., distance D1, D2, angle A1, and/or orientation information of the auricular device 100 and/or case 200) can be transmitted to and/or determined by processor 102, 202, and/or an external device (e.g., external device of FIG. 3A-3B). Moreover, an auricular device 100, case 200, and/or external device can transmit, to the auricular device 100 and/or the case 200 audio data based on processed audio as described herein, to enhance the audio experience of a user 501.

In some examples, the accuracy of an estimated distance D1 and/or D2 can affect the quality of a spatially processed signal. For example, decreasing the actual distance between an auricular device 100 and/or case 200 and the audio source 502 can increase the accuracy of a distance estimate (e.g., D1 and/or D2) and the quality of a processed signal. For example, an amplitude difference between a first microphone and a second microphone in a microphone array associated with an auricular device 100 and/or case 200 can increase as the auricular device 100 and/or case 200 is moved closer to an audio source 502 resulting in a more accurate distance estimate. Conversely, the accuracy of an estimated distance D1 and/or D2, and the overall quality of a spatially processed signal can decrease as the actual distance between an auricular device 100 and/or case 200 and the audio source 502 increases.

Figure 6:
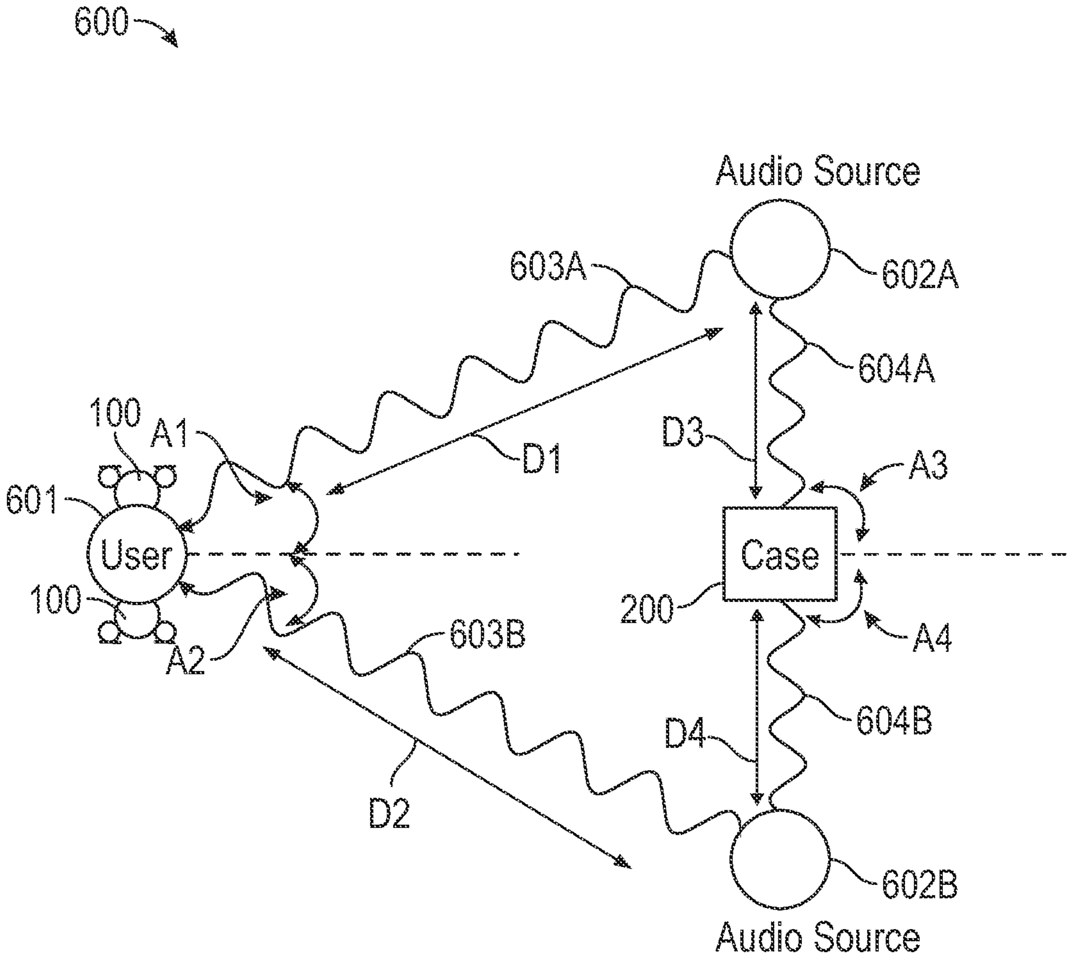
FIG. 6 illustrates an example implementation of an auricular device and an external device configured for triangulated beamforming.

FIG. 6 illustrates an example implementation of an acoustic environment 600 configured for adaptive beamforming. In some examples, it may be advantageous to leverage an external device (e.g., such as a case 200 and/or the like) to enhance quality of audio emitted by an auricular device 100. In some examples, an auricular device 100 and/or case 200 can spatially process audio based on characteristics associated with an acoustic environment 600, to enhance the localization of an audio source such that the user 601 perceives the audio as if the user 601 was at another location and/or at a different orientation. In some implementations, an acoustic environment 600 of FIG. 6 can be the same and/or similar to an operating environment depicted in FIGS. 3A-3B.

As depicted, an acoustic environment 600 of FIG. 6 can include a user 601 wearing an auricular device 100 (e.g., auricular device 100 of FIG. 2A), a case 200 (e.g., case 200 of FIG. 2B), a first audio source 602A, and a second audio source 602B. A user 601 can be positioned at a distance D1 from a first audio source 602A, and at a distance D2 from a second audio source 602B. Case 200 can be positioned at a distance D3 from a first audio source 602A and at a distance D4 from a second audio source 602B. Audio source 602A and/or 602B can be an audio speaker, a person speaking, and/or another source of audio. Audio 603A and/or 604A can be the same and/or similar to audio originating from audio source 602A. Audio 603B and/or 604B can be the same and/or similar to audio originating from audio source 602B.

An auricular device 100 and/or case 200 can determine a distance D1, D2, D3, and/or D4 based on, for example, a received amplitude of audio 603A, 603B, 604A, and/or 604B respectively. In some examples, and auricular device 100 and/or a case 200 may be configured with a microphone array, and distance D1, D2, D3, and/or D4 may be determined based on a comparison between an amplitude of audio 603A, 603B, 604A, and/or 604B received at a first microphone and a second microphone in the microphone array. Distance D1, D2, D3, and/or D4 can be, for example, any distance (e.g., 1, 5, 10, 20 or more meters).

An auricular device 100 and/or a case 200 can determine one or more angles (e.g., A1, A2, A3, and/or A4 of FIG. 6). For example, an auricular device 100 and/or a case 200 can determine an auricular device 100 and/or a case 200 can determine a first angle A1 between a user 601 and an audio source 602A, and/or a second angle A2 between a user 601 and an audio source 602B. In some examples, an auricular device 100 and/or case 200 can determine a third angle A3 between a first audio source 602A and a case 200, and a fourth angle A4 between a second audio source 602B and the case 200. Additionally, an auricular device 100 and/or case 200 can determine angle A1, A2, A3, and/or A4 based on, for example, applying an adaptive beamforming and/or another technique as described herein.

Additionally and/or advantageously, an auricular device 100 (e.g., via processor 102) can determine orientation information of the auricular device 100 relative to audio 603A and/or 603B (e.g., orientation information of the user 601 relative to audio 603A, 603B). Orientation information can include 2D orientation information (e.g., a heading such as approximately 0 degrees North) and/or 3D orientation information (e.g., rotational and/or translational degrees of freedom). In some examples, an auricular device 100 configured with an array of microphones can determine orientation information based on adaptive beamforming applied to audio 603A and/or 603B. In some implementations, an auricular device 100 can receive orientation information from a case 200, an external device, and/or from gyroscopes 116 and/or accelerometer(s) 114 as described herein (e.g., by using an IMU).

Optionally, a case 200 (e.g., via processor 202 and/or the like) can determine orientation information of the case 200 relative to audio 604A and/or 604B (e.g., relative to the direction of one or more audio sources 602A and/or 602B). Orientation information can include 2D orientation information (e.g., a heading such as approximately 0 degrees North) and/or 3D orientation information (e.g., rotational and/or translational degrees of freedom). In some examples, a case 200 can determine orientation information based on an adaptive beamformer applied to audio 604A and/or 604B. In some implementations, a case 200 can receive orientation information from an auricular device 100, an external device, and/or from gyroscopes 216 and/or accelerometer(s) 214 as described herein (e.g., by using an IMU and/or the like).

Advantageously, an auricular device 100 and/or a case 200 can be configured to determine one or more characteristics of an acoustic environment 600 (e.g., orientation information, one or more angles A1, A2, A3 and/or A4, and/or distance D1, D2, D3, and/or D4) by spatially processing audio (e.g., 603A, 603B, 604A, and/or 604B). In some examples, spatially processed audio data can be a stereo signal. In some examples, an auricular device 100 can transmit a spatially processed audio to a user 601 via speakers 124, such that the user 601 perceives the audio as if the user 601 was located at the same position and/or orientation as the case 200. For example, an auricular device 100 can spatially process audio to allow the user 601 to perceive audio as if the user 601 were in the middle of two audio sources.

VII. Example Adaptive Beamforming Routine

Figure 7:
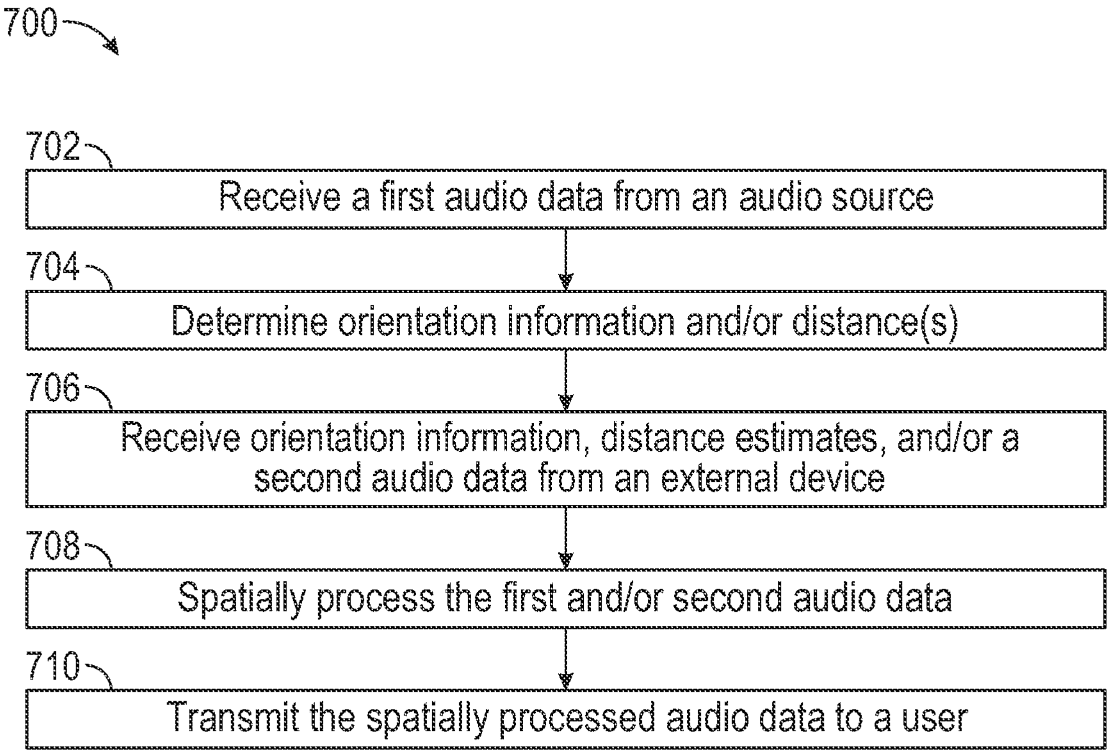
FIG. 7 is an example flowchart of an adaptive beamforming routine illustratively implemented by an auricular device.

FIG. 7 is an example flowchart of an adaptive beamforming routine 700 illustratively implemented by an auricular device 100 according to one embodiment. As an example, an auricular device 100 including a processor 102 and/or a beamformer filter unit 128 (among other components) of FIG. 2A can be configured to execute the adaptive beamforming routine 700. The adaptive beamforming routine 700 can spatially audio to provide an enhanced listening experience to a user. For example, an auricular device 100 can a spatially process audio data to provide a user with an immersive experience (e.g., creating a stereo and/or surround sound experience and/or the like), a directional perception (e.g., changing the arrival time and/or intensity of one or more sounds at the ears of the user), enhanced communication to optimize the transmission and reception of audio from a direction, an audio source, sound localization (e.g., to allow a user to perceive a direction and distance of sound), and/or noise cancellation. The adaptive beamforming routine 700 begins at block 702.

At block 702, the auricular device 100 can receive a first audio data from an audio source. As described with reference to FIG. 5A-5B, an auricular device 100 can receive, via microphones 122, audio 503A from an audio source 502. Thereafter, microphones 122 can transmit audio data associated with audio 503A to a processor 102. An auricular device 100 can be configured to receive audio 503A via one or more microphones within a microphone array as described herein. In some examples, an auricular device 100 can use a microphone array along with a beamformer filter unit 128 to spatially process audio. In some examples, the microphone array is a single channel microphone array and/or a multi-channel microphone array.

At block 704, the auricular device 100 can determine orientation information and/or distance(s). For example, and with reference to FIG. 5A, an auricular device 100 (e.g., processor 102) can determine orientation information based a first audio data associated with audio 503A. In some examples, an auricular device 100 can determine orientation information based on an adaptive beamformed technique applied to received audio 503A (e.g., audio data associated with audio 503A) from one or more microphones in a microphone array. Additionally and/or alternatively, a processor 102 can receive orientation information form, for example, gyroscopes 116 and/or accelerometer(s) 114 as described herein (e.g., by using an IMU and/or the like). Orientation information can include 2D and/or 3D information as described herein.

An auricular device 100 can determine and/or estimate a distance from an audio source 502 to the auricular device 100, based on a received audio 503A. For example, an auricular device 100 can be configured with a microphone array, wherein the auricular device (e.g., via processor 102) uses the microphone array to determine a distance between the auricular device 100 and an audio source 502. In some examples, a processor 102 can determine a distance based on a comparison between an amplitude of audio 503A received at a first microphone and at a second microphone of a microphone array.

At block 706, the auricular device 100 can receive orientation information, estimated distance(s), and/or a second audio data from an external device. With continued reference to FIG. 5A, an auricular device 100 can receive orientation information from an external device such as, for example, case 200. Orientation information can be determined based on a received audio 503B from case 200. As mentioned above, orientation information can include 2D and/or 3D information. Orientation information can be determined by, for example, gyroscopes 216 and/or accelerometer(s) 114 (e.g., by using an IMU and/or the like). In some examples, a case 200 can determine orientation information based on an adaptive beamformed technique applied to a received audio 503B from one or more microphones in a microphone array.

The auricular device 100 can receive estimated distance(s) from an external device. A processor 102 can receive a distance estimate from, for example, a case 200 (and/or another external device as described herein) positioned near an audio source 502. In some examples, a case 200 can be configured with a microphone array, wherein the microphone array is used to determine a distance from an audio source 502 to the case 200. In some examples, an external device (e.g., via processor 202 of case 200 and/or the like) can determine a distance estimate based on a comparison between an amplitude of audio 503B received at a first microphone and at a second microphone in a microphone array.

The auricular device 100 can further receive a second audio data from an external device. The audio data can be, for example, associated with audio 503B of FIG. 5A. In some examples, the auricular device 100 can receive audio 503B (e.g., audio data associated with audio 503B) in response to a transmitted signal from external device (e.g., case 200). For example, a case 200 can receive audio 503B and transmit audio data associated with audio 503B to an auricular device 100. The audio data associated with audio 503B can be single channel and/or multi-channel audio data, based on, for example, a microphone array of case 200 as described herein (e.g., a mono and/or stereo audio and/or the like).

At block 708, the auricular device 100 can spatially process the first audio data and/or the second audio data. For example, an auricular device 100 of FIG. 5A-5B can spatially process received audio data associated with audio 503A and/or 503B based on one or more characteristics of an acoustic environment 500A (e.g., the orientation information, distance estimate D1, and/or first audio 503A of an auricular device 100 and/or the orientation information, distance estimate D2 and/or second audio 503B of the case 200). In some examples, an auricular device 100 can spatially process a first audio data and/or second audio data associated with audio 503A and/or 503B based on a determined angle A1. An auricular device 100 can determine an angle A1 based on the one or more characteristics of an acoustic environment 500A as described herein.

In some examples, an auricular device 100 can spatially process a second audio data having a higher SNR than a first audio data as described above with reference to FIG. 5A-5B. Advantageously, an auricular device 100 can apply adaptive beamforming (e.g., an auricular device 100 in communication with a case 200 and/or the like), to leverage a high SNR, a narrower directional accuracy, and/or an increased range accuracy of audio received by the auricular device 100 (e.g., an acoustic signal transmitted to the auricular device 100 from a case 200 positioned close to an audio source and/or the like). Advantageously, an auricular device 100 can apply a beamformed acoustic signal (e.g., a spatially processed audio data) to enhanced acoustic signal such as audio 503C of FIG. 5B. In some examples, an auricular device 100 can spatially process audio from multiple audio sources (e.g., 2, 3, 4, 5 etc.).

At block 710, the auricular device 100 can transmit the spatially processed first and/or second audio data to a user. As described in FIGS. 2A and/or 5B, a processor 102 can transmit enhanced audio 503C to a user 501 via one or more speakers 124 of an auricular device 100. The enhanced audio 503C can be the result of a spatially processed signal as descried herein. As illustrated in the example of FIG. 5B, the processor 102 can transmit audio 503C to a user 501, such that the user 501 can perceive the audio 503C as if the sound were coming from the same and/or a similar direction as audio 503A, but including the increased SNR, a narrower directional accuracy, and/or an increased range accuracy of audio 503B. In some implementations, a processor 102 can provide a user with a spatially processed signal, wherein the user perceives that the sound is originating from another direction, and/or that the sound is closer and/or farther way than other sounds in an environment. A processor 102 can create a spatially processed signal that may filter one or more audio sources to enhance audio coming from a first audio source while attenuating audio originating form one or more additional audio sources.

VIII. Terminology

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Conditional language used herein, such as, among others, "can," "could," "might," "may" "e.g.," and the like, unless specifically stated otherwise, or otherwise understood within the context as used, is generally intended to convey that certain features, elements, and/or steps are optional. Thus, such conditional language is not generally intended to imply that features, elements, and/or steps are in any way required or that one or more embodiments necessarily include logic for deciding, with or without other input or prompting, whether these features, elements, and/or steps are included or are to be always performed. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Although certain embodiments and examples have been described herein, it will be understood by those skilled in the art that many aspects of the systems and devices shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Any methods disclosed herein need not be performed in the order recited. The methods disclosed herein may include certain actions taken by a practitioner; however, they can also include any third-party instruction of those actions, either expressly or by implication.

The methods and tasks described herein may be performed and fully automated by a computer system. The computer system may in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may but need not, be co-located. The results of the disclosed methods and tasks may be persistently stored by transforming physical storage devices, such as solid-state memory chips and/or magnetic disks, into a different state. The computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Various illustrative logical blocks, modules, routines, and algorithm steps that may be described in connection with the disclosure herein can be implemented as electronic hardware (e.g., ASICs or FPGA devices), computer software that runs on general purpose computer hardware, or combinations of both. Various illustrative components, blocks, and steps may be described herein generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, various illustrative logical blocks and modules that may be described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can include electrical circuitry configured to process computer-executable instructions. A processor can include an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of any method, process, routine, or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features, it can be understood that various omissions, substitutions, and changes in the form and details of the devices or algorithms illustrated can be made without departing from the spirit of the disclosure. As can be recognized, certain portions of the description herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

an external device configured to transmit first audio data to an ear-bud, the first audio data corresponding to sound received from an audio source, wherein the external device is at a first location with respect to the audio source; and the ear-bud configured to be positioned within an ear canal of a user, the ear-bud comprising:

a microphone configured to generate audio data responsive to detecting audio;

a storage device, configured to store computer-executable instructions; and one or more processors in communication with the storage device, wherein the computer-executable instructions, when executed by the one or more processors, cause the one or more processors to:

receive the first audio data from the external device;

receive second audio data from the microphone, wherein the second audio data corresponds to sound received from the audio source, wherein the ear-bud is at a second location with respect to the audio source;

estimate an acoustic environment based on the first audio data and the second audio data, the acoustic environment including at least a first distance between the ear-bud and the audio source, a second distance between the external device and the audio source, a first orientation of the ear-bud with respect to the audio source, and a second orientation of the external device with respect to the audio source;

generate third audio data based on the acoustic environment, the first audio data, and the second audio data; and cause a speaker to emit audio corresponding to the third audio data within the ear canal of the user, wherein the audio represents sound from the audio source corresponding to the first orientation of the ear-bud with respect to the audio source.

2. The system of claim 1, wherein the ear-bud further comprises:

a second microphone configured to generate audio data responsive to detecting audio; and wherein the computer-executable instructions, when executed by the one or more processors, further cause the one or more processors to:

determine the first distance based on a comparison of the second audio data detected at the microphone and at the second microphone.

3. The system of claim 1, wherein the external device further comprises a first microphone and a second microphone configured to generate audio data responsive to detecting audio; and wherein the computer-executable instructions, when executed by the one or more processors, further cause the one or more processors to:

determine the second distance based on a comparison of the first audio data received from the first microphone and the second microphone of the external device.

4. The system of claim 1, wherein the first orientation includes an estimated heading of the ear-bud and a direction of the second audio data, and wherein the second orientation includes an estimated heading of the external device and a direction of the first audio data.

5. The system of claim 1, wherein the third audio data is generated based on spatially processing the first audio data and the second audio data.

6. The system of claim 1, wherein the first orientation of the ear-bud is generated at least in part by an IMU.

7. The system of claim 1, wherein the first orientation device is at least one of a case, a podium, or a desktop microphone.

8. The system of claim 1, wherein the audio source is a human.

9. An ear-bud configured to be positioned within an ear canal of a user, the ear-bud comprising:

a microphone configured to generate audio data responsive to detecting audio;

a storage device, configured to store computer-executable instructions; and one or more processors in communication with the storage device, wherein the computer-executable instructions, when executed by the one or more processors, cause the one or more processors to:

receive first audio data from an external device, the first audio data corresponding to sound received from an audio source, wherein the external device is at a first location with respect to the audio source;

receive second audio data from the microphone, wherein the second audio data corresponds to a sound received form the audio source, wherein the ear-bud is at a second location with respect to the audio source;

estimate an acoustic environment based on the first audio data and the second audio data, the acoustic environment including at least a first distance between the ear-bud and the audio source, a second distance between the external device and the audio source, a first orientation of the ear-bud with respect to the audio source, and a second orientation of the external device with respect to the audio source;

generate third audio data based on the acoustic environment, the first audio data, and the second audio data; and cause a speaker to emit audio corresponding to the third audio data within the ear canal of the user, wherein the audio represents sound from the audio source corresponding to the first orientation of the ear-bud with respect to the audio source.

10. The ear-bud of claim 9, further comprising:

a second microphone configured to generate audio data responsive to detecting audio; and wherein the computer-executable instructions, when executed by the one or more processors, further cause the one or more processors to:

determine the first distance based on a comparison of the second audio data detected at the microphone and at the second microphone.

11. The ear-bud of claim 9, wherein the computer-executable instructions, when executed by the one or more processors, further cause the one or more processors to:

determine the second distance based on a comparison of the first audio data received from a first microphone and a second microphone of the external device.

12. The ear-bud of claim 9, wherein the first orientation includes an estimated heading of the ear-bud and a direction of the second audio data, and wherein the second orientation includes an estimated heading of the external device and a direction of the first audio data.

13. The ear-bud of claim 9, wherein the third audio data is generated based on spatially processing the first audio data and the second audio data.

14. The ear-bud of claim 9, wherein the first orientation of the ear-bud is generated at least in part by an IMU.

15. The ear-bud of claim 9, wherein the first audio data is received from a case, a podium, or a desktop microphone.

16. The ear-bud of claim 9, wherein the audio source is a human.

17. A method comprising:

receiving first audio data from an external device, the first audio data corresponding to sound received from an audio source, wherein the external device is at a first location with respect to the audio source;

receiving second audio data from a microphone of an ear-bud, wherein the second audio data corresponds to sound received from the audio source, wherein the ear-bud is at a second location with respect to the audio source;

estimating an acoustic environment based on the first audio data and the second audio data, the acoustic environment including at least a first distance between the ear-bud and the audio source, a second distance between the external device and the audio source, a first orientation of the ear-bud with respect to the audio source, and a second orientation of the external device with respect to the audio source;

generating third audio data based on the acoustic environment, the first audio data, and the second audio data; and causing a speaker to emit audio corresponding to the third audio data within an ear canal of a user, wherein the audio represents sound from the audio source corresponding to the first orientation of the ear-bud.

18. The method of claim 17, further comprising: wherein the first orientation of the ear-bud is generated at least in part by an IMU.

19. The method of claim 17, wherein the third audio data is generated based on spatially processing the first audio data and the second audio data.

20. The method of claim 17, wherein the audio source is a human.

* * * * *